(12) United States Patent
Cooper et al.

(10) Patent No.: US 12,103,573 B2
(45) Date of Patent: Oct. 1, 2024

(54) CONTROL SYSTEM AND METHOD FOR A TRANSPORTATION NETWORK

(71) Applicant: Transportation IP Holdings, LLC, Norwalk, CT (US)

(72) Inventors: Jared Klineman Cooper, Melbourne, FL (US); Samuel William Golden, Melbourne, FL (US); Robert James Foy, Melbourne, FL (US); David Michael Peltz, Melbourne, FL (US); Nathan Thomas North, Seattle, WA (US); Milan Karunaratne, Orange, CA (US); Anthony D. Paul, Anchorage, AK (US); Gregory Wright, Longmont, CO (US); William Carnegie, Ortonville, MI (US); Daniel McNair, Fort Worth, TX (US)

(73) Assignee: Transportation IP Holdings, LLC, Norwalk, CT (US)

( * ) Notice: Subject to any disclaimer, the term of this patent is extended or adjusted under 35 U.S.C. 154(b) by 21 days.

(21) Appl. No.: 17/988,698

(22) Filed: Nov. 16, 2022

(65) Prior Publication Data

US 2023/0075689 A1 Mar. 9, 2023

Related U.S. Application Data

(60) Continuation-in-part of application No. 17/504,342, filed on Oct. 18, 2021, now Pat. No. 12,017,555, and
(Continued)

(51) Int. Cl.
*B61L 27/12* (2022.01)
*B61L 17/00* (2006.01)
(Continued)

(52) U.S. Cl.
CPC ............... *B61L 27/12* (2022.01); *B61L 17/00* (2013.01); *B61L 27/14* (2022.01); *B61L 27/16* (2022.01)

(58) Field of Classification Search
CPC .................................. B61L 27/12; B61L 17/00
See application file for complete search history.

(56) References Cited

U.S. PATENT DOCUMENTS 8,701,804 B1 * 4/2014 Antrobus ................. B60K 6/00
903/906
2002/0188387 A1 12/2002 Woestman et al.
(Continued)

FOREIGN PATENT DOCUMENTS

JP  2012230523 A  * 11/2012
JP  2013192285 A  *  9/2013

OTHER PUBLICATIONS

First Examination Report for corresponding AU Application No. 2022291546 dated Jan. 26, 2024 (5 pages).

*Primary Examiner* — Edwin A Young
(74) *Attorney, Agent, or Firm* — K&L Gates LLP

(57) ABSTRACT

A control system including one or more processors that may determine vehicle locations of one or more vehicles and states of charge of vehicle energy storage devices onboard the one or more vehicles. The control system may include an energy chassis having a fuel source holding a supply of fuel, an energy converter to convert at least a portion of the supply of the fuel from the fuel source into electric energy, and a communication device to communicate with the processors. The processors may direct which of the one or more vehicles are to couple with and be powered by the electric energy of the energy chassis based on one or more of: the vehicle locations, the states of charge of the vehicle energy storage
(Continued)

devices, an amount of the supply of the fuel of the energy chassis, and a chassis location of the energy chassis.

20 Claims, 11 Drawing Sheets

Related U.S. Application Data a continuation-in-part of application No. 17/030,076, filed on Sep. 23, 2020, now Pat. No. 11,518,422, which is a continuation of application No. 16/695,270, filed on Nov. 26, 2019, now Pat. No. 10,822,007, which is a continuation of application No. 16/289,236, filed on Feb. 28, 2019, now Pat. No. 10,532,755, which is a continuation-in-part of application No. 15/089,574, filed on Apr. 3, 2016, now Pat. No. 10,220,864, which is a division of application No. 14/226,921, filed on Mar. 27, 2014, now Pat. No. 9,327,741.

(51) Int. Cl.
*B61L 27/14* (2022.01)
*B61L 27/16* (2022.01)

(56) References Cited

U.S. PATENT DOCUMENTS

| | | |
|---|---|---|
| 2011/0224859 A1 | 9/2011 | Pipponen et al. |
| 2012/0109442 A1 | 5/2012 | Kato et al. |
| 2012/0283902 A1 | 11/2012 | Kusumi et al. |
| 2012/0303237 A1* | 11/2012 | Kumar ............... B61L 15/0058 |
| | | 701/99 |
| 2012/0316717 A1 | 12/2012 | Daum et al. |
| 2022/0275588 A1* | 9/2022 | Walton .................. E01B 29/32 |

* cited by examiner

CONTROL SYSTEM AND METHOD FOR A TRANSPORTATION NETWORK

CROSS-REFERENCE TO RELATED APPLICATIONS

This application is a continuation-in-part of U.S. patent application Ser. No. 17/504,342, filed 18 Oct. 2021, and a continuation-in-part of U.S. patent application Ser. No. 17/030,076, filed 23 Sep. 2020, which is a continuation of U.S. patent application Ser. No. 16/695,270, filed 26 Nov. 2019, which is a continuation of U.S. patent application Ser. No. 16/289,236, filed 28 Feb. 2019 (now U.S. Pat. No. 10,532,755), which is a continuation-in-part of U.S. application Ser. No. 15/089,574, filed 3 Apr. 2016 (now U.S. Pat. No. 10,220,864), which is a divisional of U.S. application Ser. No. 14/226,921 filed 27 Mar. 2014 (now U.S. Pat. No. 9,327,741). The entire disclosures of these applications and patents are incorporated herein by reference.

BACKGROUND

Technical Field

Embodiments are disclosed herein that relate to control systems for transportation networks.

DISCUSSION OF ART

As one or more vehicles or vehicle systems move along routes between current and upcoming location destinations, the amount of available energy to power the vehicle systems changes. The energy may be electric energy, a fluid energy such as diesel fuel, liquid hydrogen, or gasoline, and may be used to power propulsion loads and/or non-propulsion loads of the vehicle systems. The amount of available energy for the vehicle system to use or draw from changes as the vehicle system operates. For example, a state of charge of an energy storage assembly of the vehicle system may decrease responsive to the propulsion and non-propulsion loads pulling energy from the energy storage assembly. As the amount of available energy changes, it may be determined that the amount of available energy is insufficient to reach the destination location. For example, the vehicle systems may need to recharge and/or refuel prior to the vehicle systems reaching a destination location.

As vehicles in transportation networks become electrified (e.g., the vehicles are propelled using electric energy stored onboard the vehicles), the need to accurately calculate and manage the energy stored by the vehicles to complete trips may increase. While existing technologies can assist in planning for the fuel carried by vehicles and the refueling of vehicles to ensure on-time arrival of the vehicles, these technologies are not applicable to the planning of electric energy storage onboard vehicles as refueling a vehicle consumes significantly less time than recharging energy storage devices onboard vehicles. Because refueling of a vehicle can be completed over a significantly shorter time period than recharging a vehicle, the time needed to recharge vehicles may be a more significant factor in the planning of movements of vehicles in a transportation network.

Additionally, vehicles powered by onboard energy storage devices may differ in distances that the vehicles can travel on a full charge relative to fuel-consuming vehicles of the similar mass. The shorter travel distances of the onboard-energy-storage vehicles may impact the planning of movements of the vehicles in the transportation network.

Currently, recharging infrastructure for battery-powered vehicles may be primarily at fixed location. If a vehicle system needs to refuel or recharge the energy storage assembly (e.g., battery, fuel cell, or the like) in an area without charging infrastructure, the vehicle system may become stranded or the vehicle system may need to go off the vehicle system's current route to reach the recharging infrastructure. Therefore, a need may exist for, and it may be desirable to have, an energy chassis or charging station that may move with the vehicle systems or may move to the vehicle systems for charging.

BRIEF DESCRIPTION

In one embodiment, a control system is provided that may include one or more processors that may determine vehicle locations of one or more vehicles and states of charge of vehicle energy storage devices onboard the one or more vehicles. The control system may include an energy chassis having a fuel source holding a supply of fuel, an energy converter to convert at least a portion of the supply of the fuel from the fuel source into electric energy, and a communication device to communicate with the processors. The processors may direct which of the one or more vehicles are to couple with and be powered by the electric energy of the energy chassis based on one or more of: the vehicle locations, the states of charge of the vehicle energy storage devices, an amount of the supply of the fuel of the energy chassis, and a chassis location of the energy chassis.

In one embodiment, a method is provided that may include measuring an amount of a supply of fuel of a fuel source of an energy chassis. The method including determining a chassis location of the energy chassis. The method may include converting at least a portion of the supply of fuel of the fuel source into electric energy. The method may include measuring a state of charge of a vehicle energy storage assembly of one or more vehicles and determining vehicle locations of the one or more vehicles. The method may include directing which of the one or more vehicles are to couple with and be powered by the electric energy of the energy chassis based on one or more of: the vehicle locations, the states of charge of the vehicle energy storage assembly of the one or more vehicles, and the amount of the supply of the fuel of the fuel source of the energy chassis.

In one embodiment, a control system is provided that may include one or more vehicles, an energy chassis, and a controller. The one or more vehicles may include a vehicle energy storage device. The vehicle energy storage device may be powered by the energy chassis. The energy chassis may include a fuel source to hold a supply of fuel, an energy converter to convert at least a portion of the supply of the fuel from the fuel source into electric energy, and a communication device to communicate with the one or more vehicles. The controller may direct which of the one or more vehicles are to couple with and be powered by the electric energy of the energy chassis based on one or more of: a vehicle location of the one or more vehicles, a state of charge of the vehicle energy storage device of the one or more vehicles, an amount of the supply of the fuel of the energy chassis, and a chassis location of the energy chassis.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
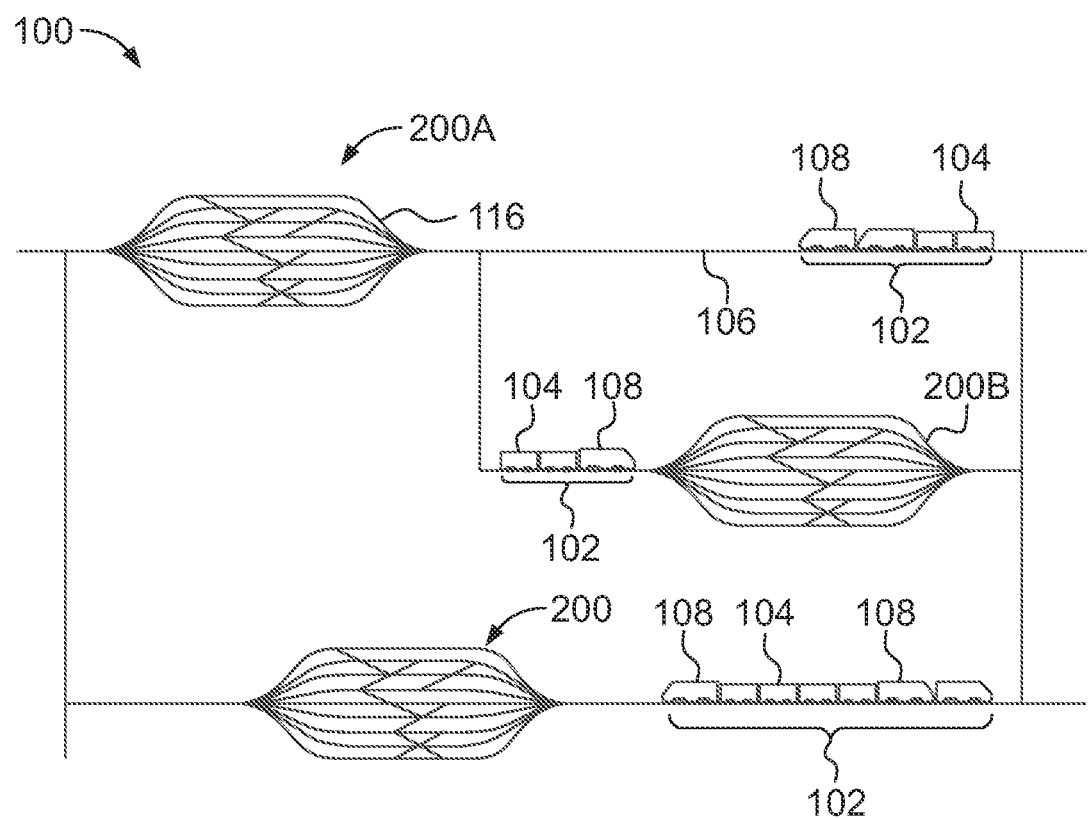
FIG. 1 is a schematic diagram of a transportation network of an embodiment.

Embodiments of the subject matter described herein relate to a control system that may include one or more vehicles having an energy storage device and an energy chassis. The energy storage device may store energy that is used to power propulsion and non-propulsion loads of the vehicles. A state of charge of the energy storage device indicates a level or amount of energy that is stored within the energy storage device and available for the one or more vehicles. The state of charge of the energy storage device may change during operation of the vehicles. As the state of charge of the energy storage device changes, the vehicles, or an off-board dispatch system, may determine that the state of charge of the vehicles is insufficient to power the vehicles to an upcoming location. The upcoming location may be a destination location, a recharging or refueling location, or a location along the route where the vehicles are scheduled to stop (e.g., to load or unload cargo, to add or remove other vehicles mechanically coupled with the one or more vehicles, or the like). In one or more embodiments, the state of charge of the energy storage device may be sufficient to reach the upcoming location, but the remaining state of charge may be less than a determined required threshold of available energy.

The energy storage device may be one or more batteries. Current battery-powered vehicles may have limited range due to the energy density of batteries compared to the weight and space required for adding more batteries to a vehicle. Additionally, battery-powered vehicles may require a different type of refueling (e.g., recharging batteries) that other vehicles, such as diesel, gasoline, or hydrogen powered vehicles. Charging infrastructure for battery-powered vehicles may be at fixed locations, which may be difficult to access for certain vehicles (e.g., locomotive or rail vehicles travelling along a track) or in certain scenarios (e.g., when the vehicle is completely out of power).

A secondary vehicle or an energy chassis may be used to allow charging of the one or more vehicles. The energy chassis may include an onboard fuel, power and electric conversion equipment, and a communication device to communicate with the one or more vehicles to be charged. The communication with the vehicles may allow the energy chassis to understand future route or trip requirements of the vehicles to optimize when and by how much to charge the energy storage devices of the vehicles. The energy chassis may be powered by diesel or gasoline engines. The energy chassis may output an electric current to charge the energy storage device of the one or more vehicles. Additionally, in one example, the energy chassis may include a motor (e.g., a traction or propulsion motor) that may allow the energy chassis to move. Transferring electricity between vehicles may be easier than passing liquid fuel between vehicles. The energy chassis may be mobile and may be hauled behind the one or more vehicles or may be placed at a location where a battery-powered vehicle may be parked that is low on battery energy.

The energy chassis may reduce the quantity of fixed charging equipment that is required to operate one or more vehicles. Additionally, the energy chassis may allow a stranded vehicle to be recharged to continue on a trip. The energy chassis may serve as a range extender.

One or more embodiments herein described provide systems and methods for coordinating a selection of one or more propulsion-generating vehicles (PGV) for forming a vehicle system having one or more cargo-carrying vehicles (CCV). The PGV may be traveling to (e.g., heading inbound to) a vehicle yard (e.g., for repair and/or maintenance of the PGV, to obtain additional fuel, to unload cargo and/or CCV off of another vehicle system, to load cargo and/or CCV onto the PGV to form the vehicle system, to sort the PGV among other PGV, or the like) or be stored within or at the vehicle yard. The vehicle yard may act as a transportation hub within a transportation network, such as when the vehicle yard is coupled with several routes extending away from the vehicle yard for the vehicle system to travel along to reach other destinations. The vehicle yard may be a final destination location of a trip of the vehicle system, or may be an intermediate location as a stopping off point when the vehicle system is traveling to another business destination (e.g., the destination to which the vehicle system is contracted to travel).

The vehicle yard may have a capacity to receive vehicle systems into the vehicle yard. This capacity can be a space limitation on the number of vehicle systems that can exit off of a main line route into the vehicle yard. Additionally or alternatively, the capacity can be a throughput limitation on the number of vehicle systems the vehicle yard can partition (e.g., removing or separating the CCV or PGV from the vehicle system) or form (e.g., coupling the CCV or PGV into the vehicle system). As vehicle systems come and go from the vehicle yard, the availability or amount of PGV to select from to form alternative configurations of the vehicle systems with the one or more CCV changes. The travel and/or amount of the vehicle systems into the vehicle yard may be controlled such that the vehicle system arrives at the vehicle yard when the vehicle yard has sufficient capacity (e.g., space) to receive the vehicle system. Alternatively, in an embodiment, the vehicle system may be instructed to slow down as the vehicle system is traveling toward the vehicle yard, due to capacity restraints of the vehicle yard, so that an alternative vehicle system having a higher priority, respectively, may arrive or be received into the vehicle yard. The vehicle system may be instructed to slow down when doing so does not have a significantly negative impact (e.g., the impact is below a designated threshold) on the flow of traffic within a transportation network formed from interconnected routes, including the route on which the vehicle travels toward the vehicle yard.

While the discussion and figures included herein may be interpreted as focusing on rail yards as vehicle yards and rail vehicle consists (e.g., trains) as the vehicle systems, it should be noted that not all embodiments of the subject matter herein described and claimed herein are limited to rail yards, trains, and railroad tracks. (A consist is a group of vehicles that are mechanically linked to travel together.) The inventive subject matter may apply to other vehicles, such as airplanes, ships, or automobiles or the like. For example, one or more embodiments may select which airplane is selected to depart with a payload from an airport, a shipping facility (e.g., where the airplane drops off and/or receives cargo for delivery elsewhere), a repair or maintenance facility, or the like. Other embodiments may apply to control which ship is selected to depart with a payload from a shipyard or dock, which semi or delivery truck departs a repair facility, a shipping or distribution facility (e.g., where the automobile picks up and/or drops off cargo to be delivered elsewhere), or the like.

FIG. 1 is a schematic diagram of an embodiment of a transportation network. The transportation network includes a plurality of interconnected routes 106, such as railroad tracks, roads, ship lanes, or other paths across which a vehicle system 102 travels. The routes may be referred to as main line routes when the routes provide paths for the vehicle systems to travel along in order to travel between a starting location and a destination location (and/or to one or more intermediate locations between the starting location and the destination location). The transportation network may extend over a relatively large area, such as hundreds of square miles or kilometers of area. While only one transportation network is shown in FIG. 1, one or more other transportation networks may be joined with and accessible to vehicles traveling in the illustrated transportation network. For example, one or more of the routes may extend to another transportation network such that vehicles can travel between the transportation networks. Different transportation networks may be defined by different geographic boundaries, such as different towns, cities, counties, states, groups of states, countries, continents, or the like. The number of routes shown in FIG. 1 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel, such as flights paths taken by airplanes, roads or highways traveled by automobiles, water-borne shipping paths (e.g., shipping lanes) taken by ships, or the like.

Several vehicle systems travel along the routes within the transportation network. The vehicle systems may concurrently travel in the transportation network along the same or different routes. Travel of one or more vehicle systems may be constrained to travel within the transportation network. Alternatively, one or more of the vehicle systems may enter the transportation network from another transportation network or leave the transportation network to travel into another transportation network. In the illustrated embodiment, the vehicle systems are shown and described herein as rail vehicles or rail vehicle consists. However, one or more other embodiments may relate to vehicles other than rail vehicles or rail vehicle consists. For example, the vehicle systems described herein can represent other off-highway vehicles (e.g., vehicles that are not designed or permitted to travel on public roadways), marine vessels, airplanes, automobiles, and the like. While three vehicle systems are shown in FIG. 1, alternatively, a different number of vehicle systems may be concurrently traveling in the transportation network (e.g., more than three, less than three).

Each vehicle system may include one or more PGV 108 (e.g., locomotives or other vehicles capable of self-propulsion) and/or one or more CCV 104. The CCV is a non-propulsion-generating vehicle, such as cargo cars, passenger cars, or other vehicles incapable of self-propulsion. The PGV and the CCV are mechanically coupled or linked together forming a vehicle system (e.g., a consist) to travel or move along the routes. The routes are interconnected to permit the vehicle systems to travel over various combinations of the routes to move from a starting location to a destination location and/or an intermediate location there between.

Figure 2:
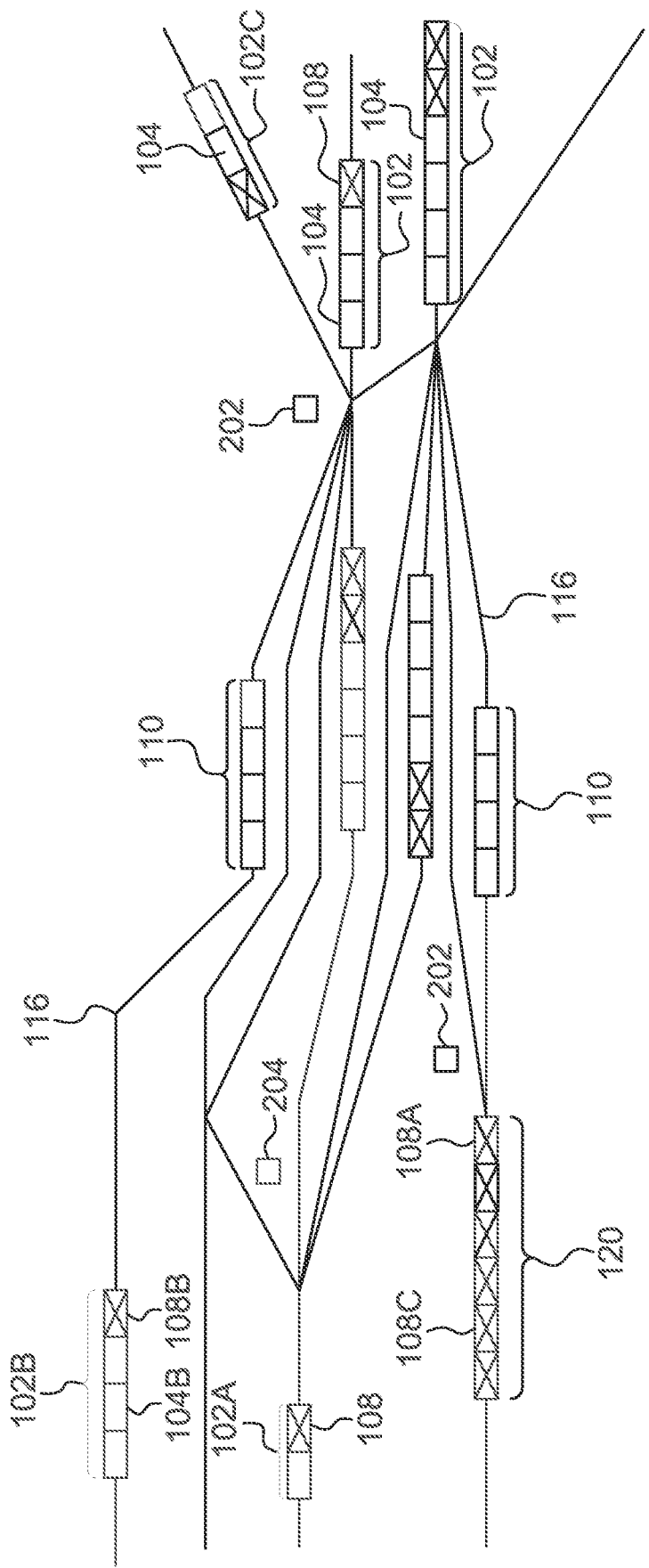
FIG. 2 is a schematic diagram of a vehicle yard in accordance with an embodiment.

The transportation network includes one or more vehicle yards 200. While three vehicle yards are shown, alternatively, the transportation network may include a different number of vehicle yards. FIG. 2 is a schematic diagram of a vehicle yard of the transportation network having a control system 150 in accordance with an embodiment. The vehicle yard is shown with a plurality of interconnected routes 116 that are located relatively close to each other. For example, the routes in the vehicle yard may be closer together (e.g., less than 10, 20, or 30 feet or meters between nearby routes) than the routes outside of the vehicle yards (e.g., more than several miles or kilometers between nearby routes).

The vehicle yards are located along the routes to provide access and service to the vehicle systems, such as to repair or maintain the one or more PGV (illustrated as a rectangle with an X in FIG. 2), re-order the sequence of vehicle systems traveling along the routes by adjusting an order to which the vehicle systems exits the vehicle yard relative to the order of the vehicle systems entering vehicle yard, partitioning and storing the one or more PGV and/or CCV (illustrated as a rectangle in FIG. 2) of the vehicle system, load or couple additional CCV and/or PGV onto the vehicle system, or the like. In an embodiment, the vehicle yards are not used as routes to travel from a starting location to a destination location. For example, the vehicle yards may not be main line routes along which the vehicle systems travel from a starting location to a destination location. Instead, the vehicle yards may be connected with the routes to allow the vehicle systems to get off of the main line routes for services described above.

Figure 3:
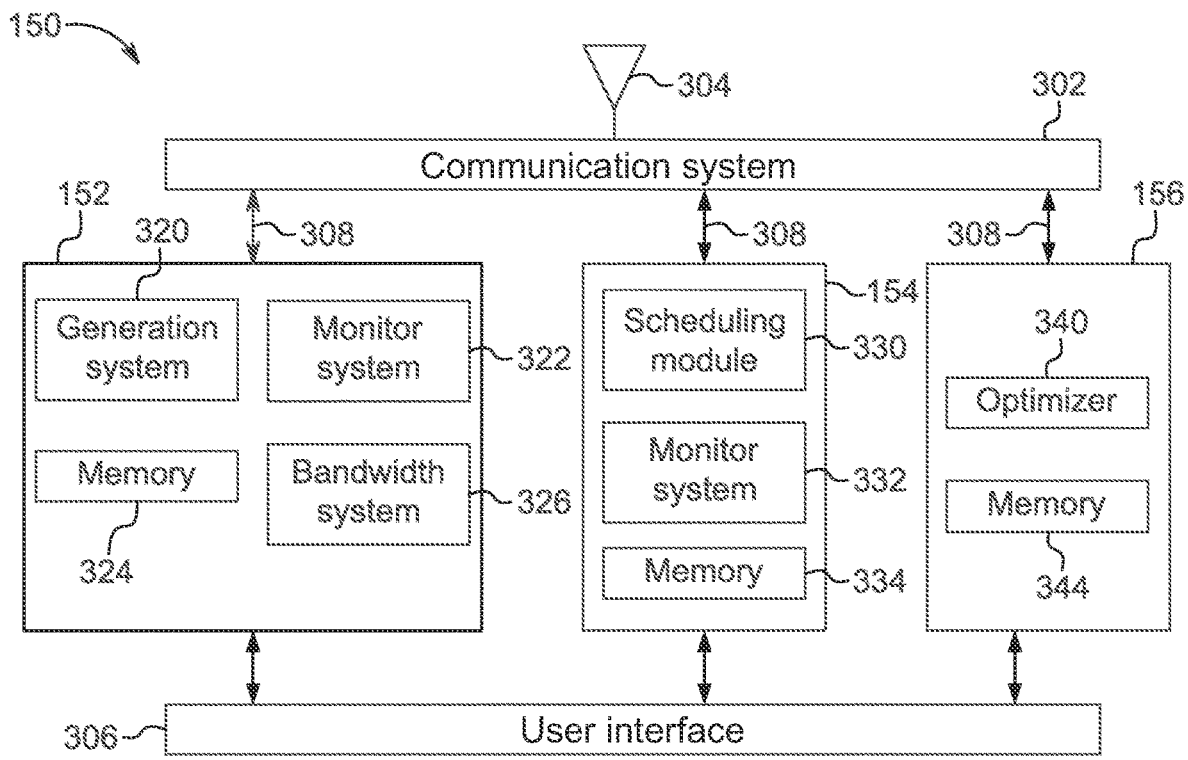
FIG. 3 is a simplified block diagram of an embodiment of a control system.

The services and operations of the rail yard are controlled by the control system. The control system may include various systems that perform operations within the vehicle yard. For example, as illustrated in FIG. 3, the control system may include a communication system 302, a user interface 306, a yard planner system 152, a scheduling system 154 (also referred to as a control system), and an energy management system 156. The yard planner system manages the planned activities within the vehicle yard, such as, processing operations that are scheduled to be performed on one or more PGV and/or CCV within the vehicle system, receiving the vehicle systems into the yard, moving the vehicles (e.g., PGV, CCV, vehicle systems) through the yard (including performing maintenance, inspection, cleaning, loading/unloading of cargo, or the like), and preparing or coupling the one or more PGV and CCV for departing the yard by forming vehicle systems (e.g., consists) which may or may not be the same vehicle system in which the CCV and PGV arrived into the vehicle yard. The scheduling system coordinates movement of the vehicle systems within the transportation network. The energy management system determines a vehicle configuration or loadout for one or more, or each, of the vehicle systems. The vehicle configuration can represent a set of one or more selected PGV to be included in the vehicle system.

The systems described herein (e.g., systems included in the control system 150 and external to the control system) may include or represent hardware and associated instructions (e.g., software stored on a tangible and non-transitory computer readable storage medium (e.g., memory 324, 334 and 344), such as a computer hard drive, ROM, RAM, or the like) that perform the operations described herein. The hardware may include electronic circuits that include and/or are connected to one or more logic-based devices, such as microprocessors, processors, controllers, or the like. These devices may be off-the-shelf devices that perform the operations described herein from the instructions described above. Additionally or alternatively, one or more of these devices may be hard-wired with logic circuits to perform these operations. Two or more of the systems may share one or more electronic circuits, processors, and/or logic-based devices. In one or more embodiments, the systems described herein may be understood as including or representing electronic processing circuitry such as one or more field programmable gate arrays (FPGA), application specific integrated circuits (ASIC), or microprocessors. The systems may be configured to execute one or more algorithms to perform functions described herein. The one or more algorithms may include aspects of embodiments disclosed herein, whether or not expressly identified in a flowchart or as a step or operation of a method. Various embodiments described herein may be characterized as having different systems/elements (e.g., modules) that include one or more processors. However, it should be noted that the one or more processors may be the same processor or different processors (e.g., each system/element implemented in a separate processor(s), the system/elements all implemented in the same processor(s), or some systems/elements in the same processor(s), and others in different processor(s)).

The yard planner system may include a monitoring system 322. The monitoring system may obtain input information used by the yard planner system to create the yard plans and monitor the yard state information of the vehicle yard and the vehicles (e.g., vehicle systems, CCV, PGV) within the yard.

The yard state information may indicate the status of the different vehicles (e.g., vehicle system, CCV, PGV) within the vehicle yard, such as where the vehicles currently are located, where the vehicles are expected (e.g., scheduled) to be located at a future time period, what operations are being performed on the vehicles, what resources (e.g., equipment, tools, personnel, or the like) are being expended or used to perform the operations on the vehicles, or the like. The yard state information may be obtained by the monitoring system using messaging (e.g., peer-to-peer messaging) with management information systems, such as system-wide vehicle inventory management systems (that monitor which vehicles are in the yard and/or locations of the vehicles as the vehicles move through the yard), through direct data entry by the operators via the user interface. For example, the monitoring system may receive the yard state information from the operator using yard workstations 202 such as computer workstations, tablet computers, mobile phones, and/or other devices through the communication system. Additionally or alternatively, some of the yard state information may be received, via the communication system, from one or more yard sensors 204 (e.g., include transponders, video cameras, track circuits, or the like) that measure or otherwise obtain data indicative of the yard state information.

Input information may include vehicle connection plans based on a priority and/or selection requests (e.g., for the vehicle system, CCV, PGV) received from the operator (e.g., using the user interface) and/or the energy management system, the destination locations (e.g., of the vehicle system, CCV, PGV) received from the operator and/or the scheduling system, or the like. A vehicle connection plan identifies one or more CCV and/or one or more PGV to be included or coupled to an outbound vehicle system (e.g., vehicle system leaving the vehicle yard). Additionally or alternatively, the input information may include primary and secondary vehicle connection plans. The secondary vehicle connection plan may represent one or more additional output vehicle systems that the one or more CCV and/or the one or more PGV may be coupled to or included to if the primary vehicle connection plan is unattainable. Optionally, the vehicle connection plans may include an order, priority list, or timing deadlines, related to the completion of the vehicle connection plan. In an embodiment the priority of the vehicle connection plan correlates to a priority of the vehicle system, CCV, and/or PGV described below. The priority of the vehicle connection plan instructs the yard planner system on the order of which vehicle system relative to the other vehicle systems to be completed in the yard plan. Optionally, the yard planner system may automatically transmit or signal to the operator within the vehicle yard to direct the coupling to complete the vehicle connection plan of the one or more PGV with the CCV.

For example, the vehicle system B enters the vehicle yard having the CCVB. The yard planner system receives input information from the scheduling system that the CCVB is scheduled for a different destination location than the destination location of the vehicle system B. To ensure that the vehicle system B and CCVB reach the appropriate destination locations, the monitoring system may match an outgoing vehicle system to the CCVB having similar destination locations or using the destination location of the outgoing vehicle system as the intermediate location for the CCVB. To determine a match, the monitoring system may track the scheduled outbound destination locations of different vehicle systems currently within the vehicle yard or entering the vehicle yard within a determined future time period (e.g., two hours before the determined departure time of the CCVB) by analyzing movement plans or schedule of the vehicle systems from the scheduling system. Once the outgoing vehicle system is selected or matched, the yard planner system may create a yard plan or modify an existing yard plan to decouple or partition the CCVB from the vehicle system B and couple the CCVB to the matched outgoing vehicle system.

Additionally or alternatively, if the matched outgoing vehicle system, determined by the monitoring system, is not within the vehicle yard (e.g., the matched outgoing vehicle system is not in the yard or is not arriving within a determined future time period), the yard planner system may create and/or modify the yard plan to decouple or partition the CCVB from the vehicle system B and couple the CCVB to a CCV group 110 to await coupling with the matched outgoing vehicle system and/or one or more PGV to form the matched outgoing vehicle system. The CCV group 110 may be formed of one or more CCV based on the determined departure time of the CCV, the destination location or intermediate location of the CCV, the type of payload within the CCV, selection by the operator of the vehicle yard, priority of the CCV, communication by a remote vehicle yard, or the like.

In an embodiment, the yard plan may be later modified or adjusted by the yard planning system after the monitoring system receives a PGV change request by the energy management system. For example, the monitoring system receives the PGV change request from the energy management system instructing that the vehicle system B should be coupled to the PGVA and not PGVB (e.g., the PGVB should be partitioned from the vehicle system B). The yard planning system may modify or adjust the yard plan to partition the PGVB from the vehicle system B and couple the PGVA to the vehicle system B.

A bandwidth system 326 of the yard planner system monitors constraints on the processing operations that are performed on one or more of the vehicles within the vehicle yard in order to move the vehicle systems into, through, and out of the vehicle yard. The bandwidth system may receive data representative of the processing constraints from one or more of the operators, sensors, or the like in order to track and/or update the processing constraints over time. The yard plans that are generated by the yard planner system may be updated when the processing constraints change or significantly change such as from route configurations, vehicle inventory, route maintenance, or the like.

For example, a bandwidth system 206 may track route configurations in the yard. The route configuration includes the layout (e.g., arrangement, orientations, allowed directions of travel, intersections, or the like) of routes (e.g., tracks) within the vehicle yard on which the vehicles travel and/or are processed in the yard. The route configuration can include the capacities of the routes within the yard, such as the sizes of the routes (e.g., lengths). Larger (e.g., longer) stretches of the routes have a larger capacity for receiving vehicles than smaller (e.g., shorter) stretches of the routes. These capacities can change with respect to time as the number of vehicles in the yard (and on the routes) changes, as segments of the route are unavailable due to maintenance or repair, as segments of the routes become available after being unavailable due to maintenance or repair, or the like.

As another example of processing constraints that can be monitored, the bandwidth system 326 may track vehicle inventories in the vehicle yard. Vehicle inventories can represent the locations of various (or all) of the vehicle systems, PGV and/or CV 104 within the vehicle yard, the intended (e.g., scheduled) locations and/or routes that the vehicles are to occupy and/or travel along in the vehicle yard, the current and/or future (e.g., scheduled) status of the processing operations being performed on the various vehicles in the yard, or the like.

A generation system 320 of the yard planner system plans movements of vehicles through the yard and processing activities to be performed on the vehicles to create the yard plan. As described above, the yard plan is a schedule of movements of the vehicles (e.g., vehicle systems, CCV, PGV) through different locations and/or along different routes within the yard, as well as a schedule of processing operations to be performed on or with the vehicles at various locations of the vehicles, as the vehicles move from an inbound consist to an outbound consist.

The monitoring system and/or bandwidth system 326 may obtain the information described above via the communication system coupled to or wirelessly communicating with the yard planner system. The communication system may include electronic circuitry and other hardware that communicates data signals with the scheduling system, the energy management system, remote control systems, the yard sensors, and/or the yard workstations. For example, the communication system may include one or more antennas 304 for wirelessly communicating with the remote control systems, sensors, and/or workstations. Additionally or alternatively, the communication system may be coupled with conductive communication pathways 308, such as one or more cables, busses, wires, rails, or the like, through which the information can be communicated with, for example, the yard planner system, the scheduling system, the energy management system, the yard sensors, and/or the yard workstations. As described below, the communication system may send data signals to one or more of the yard workstations to visually present the yard to users of the workstations.

The scheduling information obtained by the yard planner system may describe the intended routing and arrival and/or departure times of the vehicle system, CCV, and/or PGV within the transportation network. The scheduling information or the movement plan may be determined or created by the scheduling system coordinating the schedules of the various vehicle traveling within the transportation network and through the vehicle yards. The movement plan may include the origin location of the vehicle system, CCV, and/or PGV, the destination location, and/or intermediate locations (e.g., vehicle yards). Additionally, the movement plan may list the vehicle yards that the vehicles are to travel to and enter in during each portion (e.g., leg) of travel of the vehicles from the origin location to the respective destination locations. The scheduling system may be disposed at a central dispatch office, within the vehicle yard, and/or within the vehicle system. The scheduling system may create and communicate the scheduling information to one or more vehicle systems, the yard planner system, the energy management system, or the like through the communication system using a wireless connection (e.g., radio frequency (RF)) or via the conductive communication pathway.

The scheduling system includes several modules that perform various operations or functions described herein. The modules may include hardware and/or software systems that operate to perform one or more functions, such as one or more computer processors and/or one or more sets of instructions. The modules shown in FIG. 3 represent the hardware (e.g., a computer processor) and/or software (e.g., one or more sets of instructions such as software applications or hard-wired logic) used to perform the functions or operations associated with the modules. A single hardware component (e.g., a single processor) and/or software component may perform the operations or functions of several modules, or multiple hardware components and/or software components may separately perform the operations or functions associated with different modules. The instructions on which the hardware components operate may be stored on a tangible and non-transitory (e.g., not a transient signal) computer readable storage medium. The memory may include one or more computer hard drives, flash drives, RAM, ROM, EEPROM, or the like. Alternatively, one or more of the sets of instructions that direct operations of the hardware components may be hard-wired into the logic of the hardware components, such as by being hard-wired logic formed in the hardware of a processor or controller.

The scheduling system may include a scheduling module 330 that creates schedules for the vehicle systems within the transportation network and the vehicle yards. The scheduling module may form the movement plan, for example, by generating schedules for the vehicle systems that are based (at least in part) on capacities of the vehicle yards (shown in FIG. 2) to receive incoming vehicle systems. The scheduling module may delay a scheduled arrival time for a vehicle system to arrive at a vehicle yard if doing so does not have a significant negative impact on the flow of traffic in the transportation network. For example, the scheduling module may delay an arrival time of a vehicle system such that delaying the arrival time does not decrease a throughput parameter of the transportation network below a determined threshold.

The throughput parameter may represent the flow, rate, or movement of the vehicle systems traveling through the transportation network or a subset of the transportation network (e.g., the vehicle yard, segment of the route). In an embodiment, the throughput parameter may indicate how successful the vehicle systems are in arriving at the destination location or intermediate location according with respect to the schedule or movement plan associated with each vehicle system. For example, the throughput parameter may be a statistical measure of adherence of the vehicle systems to the schedules of the vehicle systems within the movement plan. The term "statistical measure of adherence" may refer to a quantity that is calculated for a vehicle system indicating how closely the vehicle system is following the schedule associated with the vehicle system. Further, several statistical measures of adherence to the movement plan may be calculated for more than one or various vehicle systems traveling within the transportation network.

The monitoring module may determine the throughput parameters for the transportation network, or an area thereof, based on the statistical measures of adherence associated with the vehicle systems. For example, a throughput parameter may be an average, median, or other statistical calculation of the statistical measures of adherence for the vehicle systems concurrently traveling in the transportation network. The throughput parameter may be calculated based on the statistical measures of adherence for all, substantially all, a supermajority, or a majority of the vehicle systems traveling in the transportation network.

The scheduling system may include a monitoring module which monitors travel of the vehicle systems within the transportation network (shown in FIG. 1) and/or capacities of the vehicle yards over time. The vehicle systems may periodically report current positions of the vehicle system to the scheduling system (and/or other information such as route and speed) so that the monitoring module may track where the vehicle systems are located over time. Alternatively, signals or other sensors disposed alongside the routes of the transportation network may periodically report the passing of vehicle system by the signals or sensors to the scheduling system. Optionally, the monitoring module may track the capacities of the vehicle yards (shown in FIG. 2) by monitoring how many vehicle systems enter and how many vehicle systems leave each of the vehicle yards. Additionally or alternatively, the monitoring system may receive vehicle connection plan status updates from the yard planner system relating to the position or estimate of when the vehicle system may leave the vehicle yard.

The monitoring module may determine the throughput parameters of the transportation network (shown in FIG. 1) and/or areas of the transportation network that are used by the scheduling module. The monitoring module may calculate the throughput parameters based on the schedules of the vehicle systems and deviations from the schedules by the vehicle systems. For example, in order to determine a statistical measure of adherence to the schedule associated with the vehicle system, the monitoring module may monitor how closely the vehicle system adheres to the schedule (e.g., arrival times of the vehicle system at a destination or intermediate location compared to the scheduled arrival time) as the vehicle system travels within the transportation network.

The vehicle system may adhere to the schedule of the vehicle system by proceeding along a path on the route toward the scheduled destination or intermediate location such that the vehicle system will arrive at the scheduled location at the scheduled arrival time or within a determined time buffer of the scheduled arrival time. For example, an estimated time of arrival (ETA) of the vehicle system may be calculated as the time that the vehicle system will arrive at the scheduled destination or intermediate location if no additional anomalies (e.g., mechanical failures, route damage, route traffic, waiting for vehicle connection plan at the vehicle yard, or the like) occur that changes the speed or departure from an intermediate location (e.g., vehicle yard) at which the vehicle system travels. If the ETA is the same as or within a determined time buffer the scheduled arrival time, then the monitoring module may calculate a large statistical measure of adherence for the vehicle system. As the ETA differs from the scheduled arrival time (e.g., by occurring after the scheduled arrival time), the statistical measure of adherence may decrease.

Additionally or alternatively, the vehicle system may adhere to the schedule by arriving at or passing through scheduled waypoints of the schedule at scheduled times that are associated with the waypoints, or within the determined time buffer of the scheduled times. As differences between actual times that the vehicle system arrives at or passes through the scheduled waypoints and the associated scheduled times of the waypoints increases, the statistical measure of adherence for the vehicle system may decrease. Conversely, as these differences decrease the statistical measure of adherence may increase.

The monitoring module may calculate the statistical measure of adherence as a time difference between the ETA of the vehicle system and the scheduled arrival time of the schedule associated with the vehicle system. Alternatively, the statistical measure of adherence for the vehicle system may be a fraction or percentage of the scheduled arrival time. For example, the statistical measure of adherence may be the difference between the ETA and the scheduled arrival time over the scheduled arrival time. Optionally, the statistical measure of adherence may further include the ETA of the vehicle system to a number of scheduled waypoints (e.g., between the origin location and/or intermediate locations and the destination location) along the path of the movement plan for the vehicle system and the scheduled arrival time. Alternatively, the statistical measure of adherence may be a sum total, average, median, or other calculation of time differences between the actual times that the vehicle system arrives at or passes by scheduled waypoints and the associated scheduled times.

The differences between when the vehicle system arrives at or passes through one or more scheduled locations and the time that the vehicle system was scheduled to arrive at or pass through the scheduled locations may be used to calculate the statistical measure of adherence to a schedule for the vehicle system. In an embodiment, the statistical measure of adherence for the vehicle system may represent the number or percentage of scheduled locations that the vehicle system arrived too early or too late. For example, the monitoring module may count the number of scheduled locations that the vehicle system arrives at or passes through outside of a time buffer around the scheduled time. The time buffer can be one to several minutes. By way of example only, if the time buffer is three minutes, then the monitoring module may examine the differences between the scheduled times and the actual times and count the number of scheduled locations that the vehicle system arrived more than three minutes early or more than three minutes late. Alternatively, the monitoring module may count the number of scheduled locations that the vehicle system arrived early or late without regard to a time buffer.

The monitoring module may calculate the statistical measure of adherence by the vehicle system to the schedule based on the number or percentage of scheduled locations that the vehicle system arrived on time (or within the time buffer). For example, the monitoring module may calculate that the vehicle system adhered to the schedule (e.g., remained on schedule) for 71% of the scheduled locations and that the vehicle system did not adhere (e.g., fell behind or ahead of the schedule) for 29% of the scheduled locations. Additionally or alternatively, the monitoring module may calculate the statistical measure of adherence by the vehicle system to the schedule based on the total or sum of time differences between the scheduled times associated with the scheduled locations and the actual times that the vehicle system arrived at or passed through the scheduled locations.

In an embodiment, the monitoring module may calculate the average statistical measure of adherence by comparing the deviation of each vehicle system from the average or median statistical measure of adherence of the several vehicle systems traveling within the transportation network. For example, the monitoring module may calculate an average or median deviation of the measure of adherence for the vehicle systems from the average or median statistical measure of adherence of the vehicle systems.

Additionally, the scheduling system may assign the priority to the vehicle system and/or the vehicles within the vehicle system (e.g., the CCV, the PGV) which may be used by the yard planner system (as described above). The priority may be based on the throughput parameter or statistical measure of adherence determined by the monitoring module 332, a business objective of the transportation network (e.g., delivery deadline of a payload of the CCV, reliance on the vehicle system and/or PGV by a plurality of other vehicle systems), by the operator of the vehicle yard, the central dispatch or other office that generates the trip plans for one or more vehicle systems, or the like.

Figure 4:
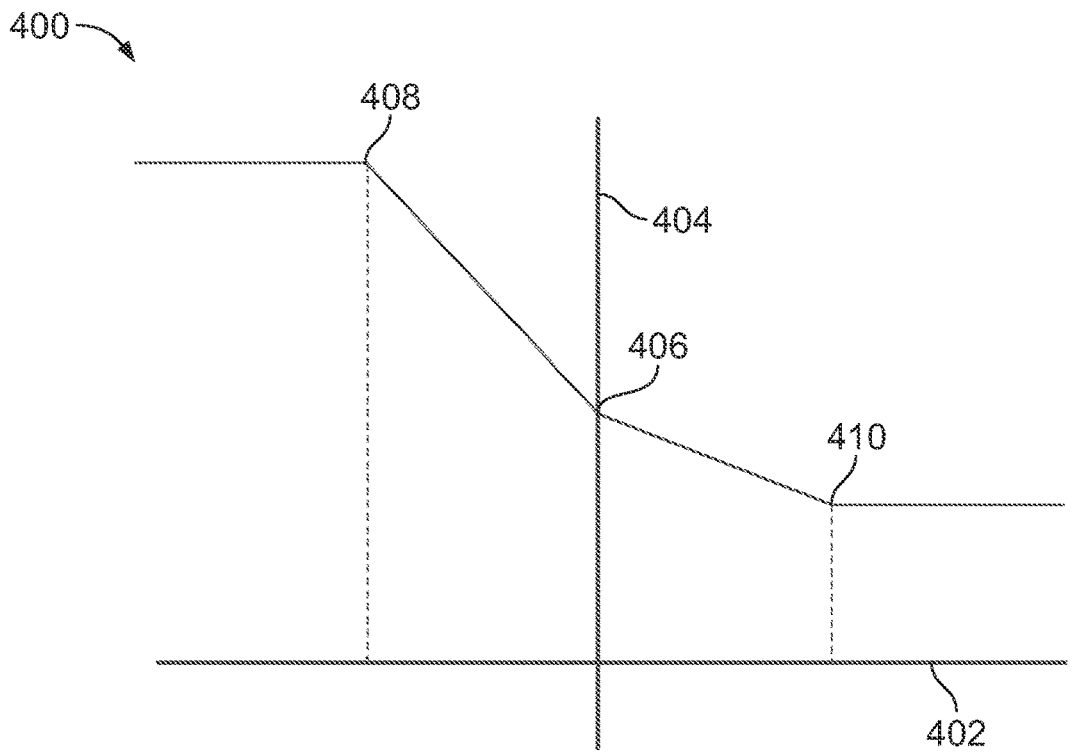
FIG. 4 is an illustration of a priority curve used by an embodiment of a scheduling/control system.
Figure 5:
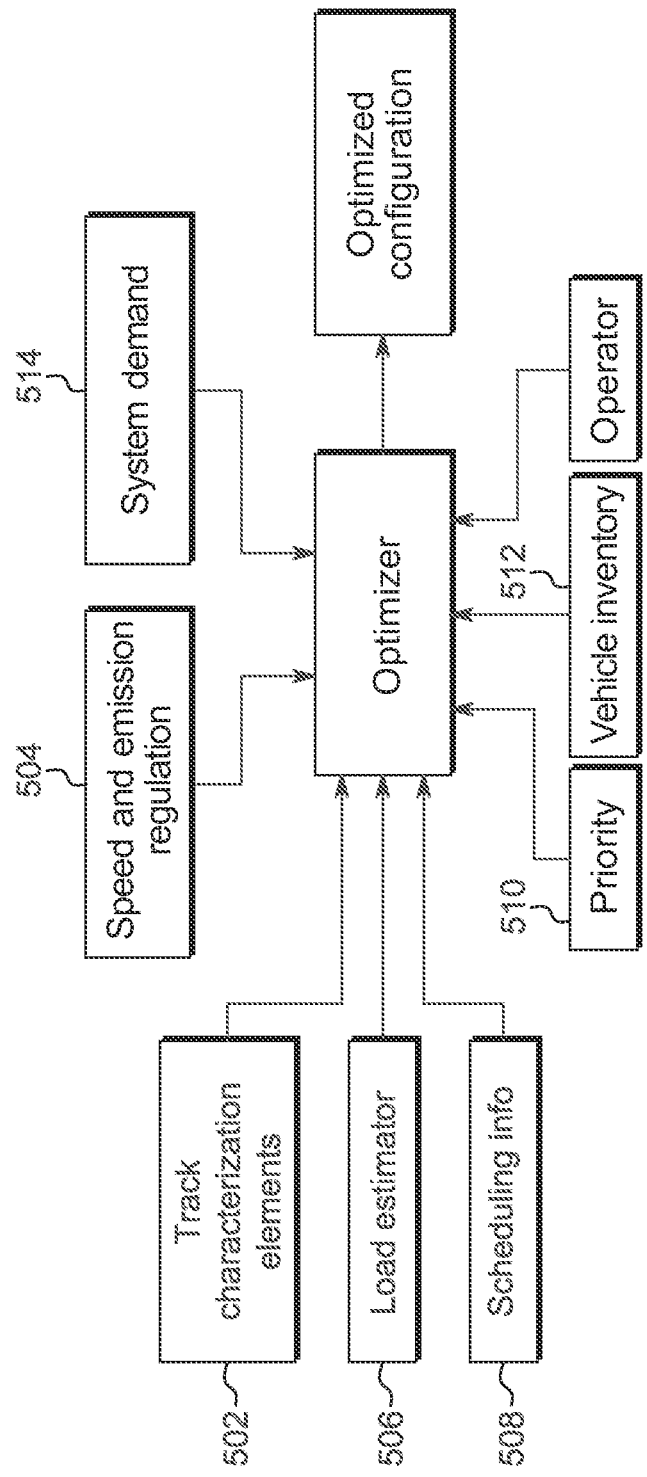
FIG. 5 is an illustration of information used by an optimizer of an energy management system in accordance with an embodiment.

FIG. 4 illustrates a priority curve 400 that may be used by the scheduling system. The priority curve may be determined and stored on memory, received by the scheduling system from an input by the operator using the user interface, or the like. The x-axis 402 may represent the statistical measure of adherence. For example, a position traversing left along the x-axis exemplifies a decreasing statistical measure of adherence (e.g., ETA of the vehicle system is greater than or later in time than the scheduled time of arrival), and conversely the position traversing right along the x-axis 402 exemplifies an increasing statistical measure of adherence (e.g., ETA of the vehicle system is lesser than or earlier in time than the scheduled time of arrival). The y-axis 404 represents the priority, such that, a position traversing upwards and away from the x-axis exemplifies an increasing priority and conversely the position traversing towards the x-axis exemplifies a decreasing priority. For example, the monitoring module is tracking three vehicles systems A, B and C entering the vehicle yard (FIG. 2) each having a movement plan. The monitoring module determines a statistical measure of adherence for each vehicle system with respect to the priority curve, such that, reference number 406 represents the vehicle system A, reference number 408 represents the vehicle system B, and reference number 410 represents the vehicle system C. Further, using the priority curve the monitoring module may determine a priority (e.g., value of the y-axis) associated for each vehicle system A, B, C and may output the said priorities to the yard planner system, using the communication system. The priority may be represented as a number for each vehicle system, a list of the vehicle systems within the transportation network and/or in the vehicle yard in a priority order, a color scheme, or the like. The yard planner system may determine or adjust the yard plan based on the priority of the incoming vehicle systems A, B, and C and/or vehicle systems currently within the vehicle yard. For example, the yard planner system may complete the vehicle connection plan of the vehicle system B, represented as reference number 408 on the priority curve, before the vehicle connection plans of the vehicle systems A and C, respectively, due to the higher priority of the vehicle system B.

The energy management system may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, such as memory. The memory may include one or more computer hard drives, flash drives, RAM, ROM, EEPROM, or the like. Alternatively, one or more of the sets of instructions that direct operations of the hardware may be hard-wired into the logic of the hardware.

The energy management system determines an optimized vehicle system configuration for the movement plan which may be used by the yard planner system to determine a vehicle connection plan to create the yard plan and/or to adjust an existing yard plan. As used herein, the term "optimize" (and forms thereof) are not intended to require maximizing or minimizing a characteristic, parameter, or other object in all embodiments described herein. Instead, "optimize" and its forms are intended to mean that a characteristic, parameter, or other object is increased or decreased toward a designated or desired amount. For example, an "optimized" vehicle system configuration for fuel efficiency is not limited to a complete absence of fuel consumption or that the absolute minimum amount of fuel is consumed by the vehicle system. Rather, the optimized vehicle system configuration for fuel efficiency may mean that the fuel efficiency is increased, but not necessarily maximized, relative to other possible vehicle system configurations available. However, the "optimized" vehicle system configuration for fuel efficiency can include reducing fuel consumption to the minimum amount possible. As another example, optimized vehicle system configuration for emission generation may not mean completely eliminating the generation of all emissions from the vehicle system. Instead, optimized vehicle system configuration for emission generation may mean that the amount of emissions generated by the vehicle system is reduced but not necessarily eliminated relative to other possible vehicle system configurations available. However, optimized vehicle system configuration and loadout for emission generation can include reducing the amount of emissions generated to a minimum amount possible. In an embodiment, the "optimized" vehicle system configuration for a characteristic (e.g., fuel efficiency, generated emissions, weight distribution), parameter (e.g., tractive effort), or other object includes increasing or decreasing the characteristic, parameter, or object (as appropriate) during performance of a mission (e.g., a trip) such that the characteristic, parameters, or object is increased or decreased (as appropriate) relative to performing the same mission in another vehicle system configuration.

With regard to the fuel, the fuel may be a single fuel type in one embodiment and in other embodiments the fuel may be a mixture of a plurality of different fuels. In one example of a fuel mixture, a first fuel may be liquid and a second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one example the fuel may be a solid energy source, such as solid hydrogen, hydrogen carriers, coal, biomass or the like. In one embodiment, fuel may be inclusive of stored energy as used herein. In that perspective, a battery state of charge, or a source of compressed gas, a flywheel, fuel cell, and other types of non-traditional fuel sources may be included.

For example, the energy management system determined that the PGVA selected for the vehicle system A traveling along a trip according to an optimized vehicle system configuration and trip plan and may result in the vehicle system A consuming less fuel and/or generating fewer emissions relative to traveling along the same trip having another vehicle configuration, such as having PGVB rather than PGVA for the vehicle system A.

The optimized vehicle configuration, for example, may be determined by an optimizer module 340 analyzing or calculating different timing and load demands of the vehicle system and the transportation network using different input information. The optimizer module may analyze the movement plan of the vehicle system, specifically, the scheduling information 508 (e.g., timing requirements of the vehicle system to arrive at the destination or intermediate location), speed and emission regulations 504 (e.g., determined and based on the route location), track characterization elements 502, a vehicle inventory 512, and the load estimator 506 to determine a minimum tractive effort threshold required to be produced by the one or more PGV selected for the optimized vehicle configuration for the vehicle system. The optimizer module may select the one or more PGV based on a sum of the tractive effort produced from each of the PGV of the vehicle inventory is at least or greater than the minimum tractive effort threshold of the vehicle system to arrive within a determined time period (e.g., scheduling information), and an optimization requirement (e.g., fuel consumption, emission generation) received from the operator, the dispatch facility, or the like. Optionally, the optimizer module may additionally base the selection and/or optimized vehicle configuration of the vehicle system on the weight distribution of the vehicle system.

The tractive effort is representative of the tractive effort the one or more PGV units are capable of and/or need to provide to propel the vehicle system along the route. The tractive effort may be a measure of pounds force or traction amps (for electric motors). The tractive effort may vary along the movement plan due to changes in parameters, for example, changes in a curvature and/or grade of the route, speed limits and/or requirements of the vehicle system, or the like. As these parameters change during the movement plan, the total tractive effort, or force, that is required to propel the vehicle system along the track 106 may change.

The track characterization elements may provide information, for example terrain characteristics, about the remaining segments or portions of the route to be traveled by the vehicle system from the vehicle yard to the destination location and/or remaining intermediate locations before the destination location (e.g., other vehicle yards) while following the movement plan. The track characterization elements may be used by the optimizer module to account for additional or reduced tractive effort needed by the one or more PGV until the destination or intermediate location. For example, the vehicle system following the movement plan along the route that has a negative average track grade from the vehicle yard to the destination or intermediate locations. The negative average track grade of the movement plan may require a lower minimum tractive effort threshold of the vehicle system than a positive or zero average track grade, respectively. The track characterization elements may include grade, elevation, curvature information, or the like of the remaining segments of the route.

The vehicle inventory may be received by the optimizer module from the yard planner system using the communication system and/or stored on the memory. The vehicle inventory may include a database of all available PGV within the vehicle yard. The availability of the PGV may be based on the vehicle connection plans of the yard plan (e.g., the available PGV are not included in any vehicle connection plans), the maintenance cycles of the PGV, user input by the operator (e.g., through the user interface), or the like.

Additionally or alternative, the yard plan may isolate or store the one or more available PGV into a larger group of PGV 120 within the vehicle yard. The database may include characteristics of the available PGV such as the weight, propulsion capabilities or tractive effort, fuel efficiency with respect to various speed or tractive efforts, range capabilities on a single fueling, or the like. The vehicle inventory may include or identify the CCV that are to be included into the optimized vehicle system configuration from the movement plan and/or yard plan (e.g., vehicle connection plans). Optionally, the vehicle inventory may include PGV and/or CCV that are included in vehicle systems that are inbound (e.g., next stop is the vehicle yard) within a set distance of the vehicle yard or scheduled to arrive into the vehicle yard within a determined future time period (e.g., within thirty minutes of the scheduled departure time of the vehicle system being optimized).

The load estimator 560 calculates a load of the vehicle system based on information contained in the vehicle inventory or yard plan (e.g., the CCV to be included in the vehicle system), historical data, a rule of thumb estimation, and/or table data.

In an embodiment, the optimizer module may receive the priority of the vehicle system and/or the CCV from the scheduling system through the communication system, vehicle yard operator, dispatch facility, or the like and adjust the minimum tractive effort threshold. For example only, the optimizer module has determined the minimum tractive effort threshold for the vehicle system B, not accounting for the priority of the vehicle system B, is 40,000 Newtons (N). The vehicle inventory includes the PGVB (currently coupled to the vehicle system B) and the larger group PGV having the PGVA and PGVC. The tractive effort of the PGVB is 30,000 N which is below the minimum tractive effort threshold for the vehicle system B when leaving the vehicle yard. The tractive effort of the PGVA is 44,000 N and the tractive effort of the PGVC is 51,000 N which are both greater than the minimum tractive effort threshold. However, regarding fuel consumption and/or generation of emissions traveling along the movement plan, the PGVA is determined by the optimizer module to consume less fuel and/or generates less emissions, respectively, than the PGVB. Due to the lower fuel consumption and/or less emissions the optimizer module selects the PGVA, and outputs the PGV selection to the yard planner system as the vehicle connection plan for vehicle system B.

Conversely, continuing with the above example, the inclusion of the priority of the vehicle system B may affect the selection of the one or more PGV by the optimizer module. The vehicle system B may be represented at 408 on the priority curve 400 (FIG. 4) illustrating a high priority. The high priority of the vehicle system B may require the vehicle system B to demand more power or tractive effort of the one or more PGV (e.g., quick acceleration, higher speed) beyond the preset requirements described above (e.g., track characterization elements, load estimator). Accordingly, the optimizer module may determine that the minimum tractive effort threshold of the vehicle system B should be increased to 50,000 N. Due to the high priority of the vehicle system B, the optimizer module selects the PGVC having a tractive effort of 50,000 N even though the PGVA has a higher fuel efficiency, respectively.

In an embodiment, the optimizer module may adjust the selection of the one or more PGV based on the availability of vehicles at the destination or intermediate locations based on a system demand database 514. The system demand database may log requests or status alerts from remote vehicle yards, operators, dispatch facilities, the schedule system, or the like of a shortage or need for one or more PGV having certain characteristics (e.g., tractive effort, speed, generated emissions, fuel efficiency). The requests on the system demand database may be automated by the scheduling system to maintain an equal distribution of one or more PGV having a higher tractive effort, set fuel efficiency, emissions, or the like. Optionally, the requests may represent a future or current need by the remote vehicle yard for a PGV having a tractive effort for an awaiting vehicle system within the remote vehicle yard.

For example only, the optimizer module has determined the minimum tractive effort threshold for the vehicle system A is 35,000 N. The vehicle inventory includes the PGVB coupled to an incoming vehicle system (the vehicle system B) and the larger group PGV having the PGVA and PGVC. The tractive efforts are of the PGVB is 30,000 N, of the PGVA is 44,000 N, and of the PGVC is 51,000 N. The optimizer module may compare the movement plan of the vehicle system A with the system demand database and determine that one of the intermediate locations (e.g., vehicle yards) has a request listed within the system demand database for a PGV having a tractive effort of over 40,000 N. The optimizer module may reset or adjust the minimum tractive effort threshold to match the requested tractive effort of the remote vehicle yard of 40,000 N resulting in the selection of PGVA and/or PGVC.

Figure 6:
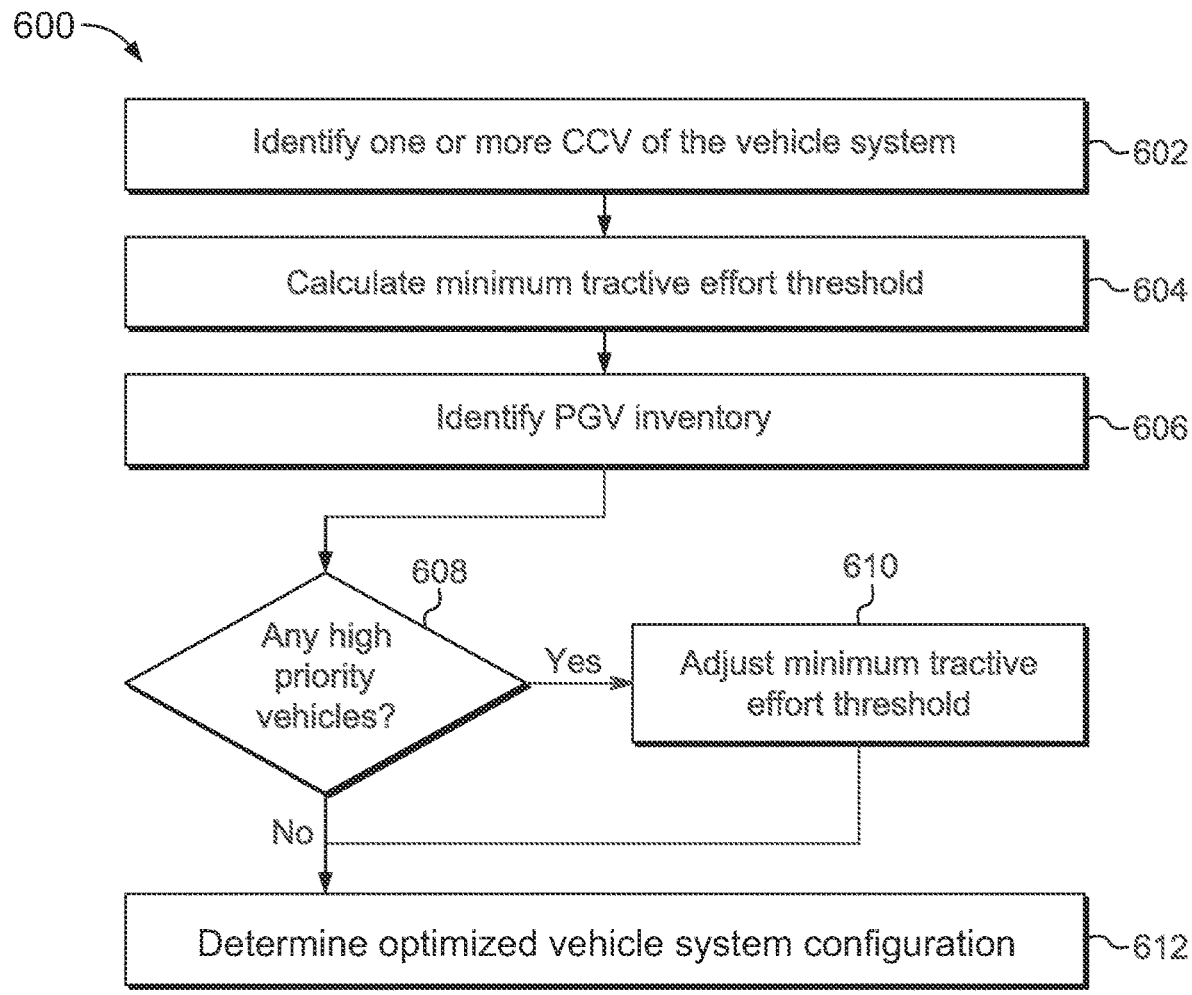
FIG. 6 is a flowchart of an embodiment of a method for a control system of a vehicle yard within a transportation network.

FIG. 6 is a flowchart of a method 600 for a control system for the vehicle yard within a transportation network. The method may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 600 may be able to be used as one or more algorithms to direct hardware to perform one or more operations described herein. Additionally or alternatively, the method may represent a workflow for the operator of a vehicle yard.

At step 602, the method may identify the one or more CCV for the vehicle system. For example, the one or more CCV may be identified by the scheduling system based on the determined departure time of the CCV, the destination location or intermediate location of the CCV, the type of payload within the CCV, selection by the operator of the vehicle yard 100, priority of the CCV, communication by a remote vehicle yard, or the like. Additionally or alternatively, the yard planner system may identify the one or more CCV using the monitoring system and group the CCV into a CCV group 110 to await coupling with the matched outgoing vehicle system and/or one or more PGV to form the matched outgoing vehicle system.

At step 604, the method may calculate the minimum tractive effort threshold. As described above, the energy management system may determine the minimum tractive effort threshold by analyzing the movement plan of the vehicle system, specifically, the scheduling information (e.g., timing requirements of the vehicle system to arrive at the destination or intermediate location), speed and emission regulations (e.g., determined and based on the route location), track characterization elements, the vehicle inventory, and the load estimator to determine a minimum tractive effort threshold required to be produce by the one or more PGV selected for the optimized vehicle configuration for the vehicle system.

At step 606, the method may identify the PGV inventory. As described above, the PGV inventory may be included within the vehicle inventory database received by the optimizer module. The PGV inventory may include all available PGV within the vehicle yard based on the vehicle connection plans of the yard plan (e.g., the available PGV are not included in any vehicle connection plans), the maintenance cycles of the PGV, user input by the operator (e.g., through the user interface), or the like. Additionally, the optimizer module may include PGV within the vehicle inventory database that are included in vehicle systems that are inbound within a set distance of the vehicle yard or scheduled to arrive into the vehicle yard within a determined future time period (e.g., within thirty minutes of the scheduled departure time of the vehicle system being optimized).

At step 608, the method may determine whether there are any high priority vehicles. If there are high priority vehicles, at step 610, the method may adjust the minimum tractive effort threshold. As described above, the priority of the vehicles (e.g., vehicle system, CCV, PGV) may be determined using the priority curve 400 (FIG. 4) by the scheduling system, the operator, or the like. Based on the priority of the vehicle, as described above, the optimizer module may adjust the minimum tractive effort threshold, for example, the optimizer module may increase the minimum tractive effort threshold of a high priority vehicle system relative to a low priority vehicle system due to the priority of the vehicle system.

At step 612, the method may determine an optimized vehicle system configuration. As described above, the optimizer module within the energy management system determines the optimized vehicle configuration by isolating the one or more PGV within the larger group of PGV available within the vehicle inventory database having a tractive effort greater than the minimum tractive effort threshold. Additionally, depending on what is being optimized (e.g., fuel efficiency, emission generation), the optimizer module determines which set of the one or more PGV to be included within the vehicle system having the highest fuel efficiency and/or lowest emission generation relative to the larger group of PGV available within the vehicle inventory database.

In one example, the method may further include automatically generating one or more signals to be communicated to an operator in the vehicle yard to direct coupling of the set of one or more PGV with the CCV to form the vehicle system.

The method may include determining a priority of the vehicle system within a rail network. The priority of the vehicle system adjusts the minimum tractive effort threshold.

In one example, the method may additionally base the minimum tractive effort threshold on a terrain of the route.

The method may further have the selection of the set of one or more PGV further based on a planned position of the set of one or more PGV within the vehicle system. Alternatively, the selection of the set of one or more PGV is further based on a weight distribution of the vehicle system. Alternatively, the selection of the set of one or more PGV is further based on a number of available PGV from a remote vehicle yard along the route or a communication from the remote vehicle yard along the route 106.

The method may further have the larger group of PGV include PGV entering the vehicle yard within a determined future time period. Additionally, the method 600 may further include determining a priority of the CCV, such that the priority of the CCV adjusts which PGV are available within the larger group of PGV.

In an embodiment, the memories may contain maintenance data of each PGV within the transportation network and/or vehicle yard. The maintenance data may include a maintenance or repair history of the PGV (may include type and date of work completed on the PGV), life span or life expectancy of parts installed in the PGV (e.g., bearings, axles, rotors, wheels, lights, air brake valve, or the like), general maintenance schedule of the PGV based on a determined distance traveled or a determined time of a previous maintenance service (e.g., flushing of fluids, check lubrication), or the like. The maintenance data may be used to determine whether a maintenance cycle of the PGV may be scheduled and included in the yard plan (e.g., vehicle connection plan) to complete a maintenance task (e.g., flushing of fluids, replacing a bearing, or the like) within the vehicle yard. For example only, the PGVB of the vehicle system B enters the vehicle yard. The yard planning system may access the general maintenance schedule relating to the PGVB stored on the memory determining (e.g., based on a length of time from the last maintenance cycle, based on a distance traveled from the last maintenance cycle) that the maintenance cycle for the PGVB may be scheduled and included in the yard plan. Accordingly, the yard planning system may include a vehicle connection plan to partition the PGVB from the vehicle system B to fulfill the maintenance cycle of the PGVB within the vehicle yard.

In one example, the method may have the selection of the set of the one or more PGV further based on the maintenance cycles of the one or more PGV. In an embodiment, select vehicle yards within the transportation network may perform maintenance tasks (e.g., replacing bearings within the electric motor) faster than or may have a needed replacement part (e.g., axle) for the maintenance cycle of the PGV relative to other vehicle yards within the transportation network. The maintenance task performance (e.g., duration of time to complete the maintenance task) and/or a replacement part inventory of the vehicle yards may be stored within a maintenance database in the memory. Additionally, the optimizer module may determine the vehicle configuration, health status, loadout and the like of the vehicle system based at least in part on the maintenance cycle of the PGV.

For example only, a vehicle system B that includes the PGVB enters the vehicle yard A. The PGVB, based on the maintenance data, may be determined to need or is due for a maintenance cycle. The maintenance cycle for the PGVB may be added to the scheduling information. The optimizer module, analyzing the scheduling information, may determine an idle time based on the maintenance database (e.g., maintenance task performance, replacement inventory) for the vehicle yard A and other vehicle yards (e.g., the vehicle yard B) within the transportation network. The idle time may represent the amount or duration of time the PGVB may be unavailable (e.g., not included within the vehicle inventory) due to the completion of the maintenance cycle. It should be noted, the idle time may include an amount of time for the vehicle yard to order or receive a needed replacement part for the maintenance cycle into the replacement part inventory. The optimizer module may compare the idle times for the maintenance cycles performed at various vehicle yards, respectively, against a determined idle threshold. Once the idle times are determined, the optimizer module may determine the selection of the set of one or more PGV for the various vehicle systems in order to minimize the PGV idle times within the transportation network. For example, the optimizer module may determine that the idle time, based on the maintenance cycle, for the vehicle yard A may be greater than the determined idle threshold. Further, the optimizer module may determine that the idle time, based on the maintenance cycle, within the vehicle yard B may be below the determined idle threshold. Based on the idle times of the vehicle yards, the optimizer module may adjust the selection of the set of one or more PGV based on the destination or intermediate location of the vehicle system. For example, the optimizer module may include and/or flag (e.g., prioritize over alternative PGV meeting optimization requirements) the PGVB within the vehicle inventory for vehicle systems that have the vehicle yard B as a destination or intermediate location within the scheduling information.

Conversely, continuing with the example above, the optimizer module may determine that the PGVB has an idle time below the determined idle threshold for the vehicle yard A. Since the idle time is below the determined threshold, the optimizer module may instruct the yard planner system to remove the PGVB from the available vehicle inventory and include a vehicle connection plan in the yard plan to partition or decouple the PGVB from the vehicle system B for the maintenance cycle.

In one embodiment, the control system includes the yard planner system having one or more processors. The yard planner system may be configured to create the yard plan for the vehicle yard that includes a vehicle connection plans for coupling a selection of one or more propulsion generating vehicles (PGV) 108 with a selection of one or more cargo-carrying vehicles (CCV) 104 to form a first vehicle system. The yard plan is further created based on the movement plan and an optimized vehicle system configuration of the first vehicle system. The control system includes the schedule system having one or more processors. The schedule system may create the movement plan of the first vehicle system. The movement plan includes a destination location and determined arrival time of the first vehicle system along a route. The control system further includes the energy management system having one or more processors. The energy management system may determine the optimized vehicle system configuration. The optimized vehicle system configuration includes the selection of the one or more PGV from a vehicle inventory having a larger group of PGV (e.g., the larger PGV group), based on the movement plan of the first vehicle system and a tractive effort of the selection of the one or more PGV.

Optionally, the selection of the one or more PGV, by the control system, may be further based on fuel consumption and/or emission generation such that the selected one or more PGV have a lower fuel consumption and/or generate less emission than the remaining PGV (e.g., the larger PGV group) in the vehicle inventory. It should be noted that the selected one or more PGV has a lower fuel consumption and/or generates less emission with respect to having or respectively to the fuel consumption and/or emissions generated if the one or more of the remaining PGV forming and propelling the vehicle system to the subsequent intermediate location or final destination along the same movement plan. The selection of the one or more PGV, by the control system, may be further based on the weight distribution of the first vehicle system.

The energy management system may be configured to determine the minimum tractive effort threshold required to propel the first vehicle system along the route at or within the determined arrival time, and the tractive effort of the selected one or more PGV is at least or greater than the minimum tractive effort threshold. Additionally, the minimum tractive effort threshold may be further based on the terrain of the route.

The vehicle inventory may include PGV entering the vehicle yard within a determined future time period.

The vehicle inventory may be adjusted based on a number of available PGV from a remote vehicle yard along the route or a communication from the remote vehicle yard.

The schedule system of the control system may be further configured to assign a priority of the first vehicle system based on the statistical measure of adherence. The statistical measure of adherence may be determined from a position of the first vehicle system relative to a scheduled position of the first vehicle system determined by the movement plan. Additionally, the yard planner system may be configured to adjust the yard plan based on the priority of the first vehicle system, such that, the vehicle connection plan of the first vehicle system displaces a vehicle connection plan of a second vehicle system having a different priority, relatively. Additionally or alternatively, the vehicle inventory may be adjusted based on the priority of the first vehicle system.

In one example, the yard planner system may generate one or more signals communicating the yard plan to an operator in the vehicle yard to direct coupling of the selection of the one or more PGV with the selection of the one or more CCV to form the first vehicle system.

The control system shown in FIG. 3 can operate to optimize a shipment schedule to incorporate electric charging of energy storage devices onboard electric vehicles traveling in the transportation network. The shipment schedule can dictate when and where the electric vehicles are to travel for the transportation of cargo. The cargo can be human passengers, products, materials, other vehicles, or a combination thereof. In contrast to a shipment schedule that merely dictates a starting location, departure time, one or more arrival locations, one or more corresponding arrival times, and optionally one or more routes to travel upon, a shipment schedule determined by the control system according to the inventive subject matter described herein can incorporate or be created based on the need for charging energy storage devices onboard the electric propulsion vehicles. The control system (e.g., the scheduling system) can create the shipping schedule to reduce or minimize a difference between a requested or desired delivery time of cargo being shipped and the actual arrival time of delivery of the cargo (e.g., reduced relative to another, different shipping schedule that is not based on the information described herein). This shipping schedule can be created to increase or maximize an overall energized state of the transportation network and/or the electric vehicles (e.g., increased relative to another, different shipping schedule that is not based on the information described herein). The shipping schedule can be created to ensure that optimal power and energy coverage is provided to the electric vehicles in the transportation network. This optimal coverage can be provided when the fuel and/or electric energy needs of the vehicles are met.

Figure 7:
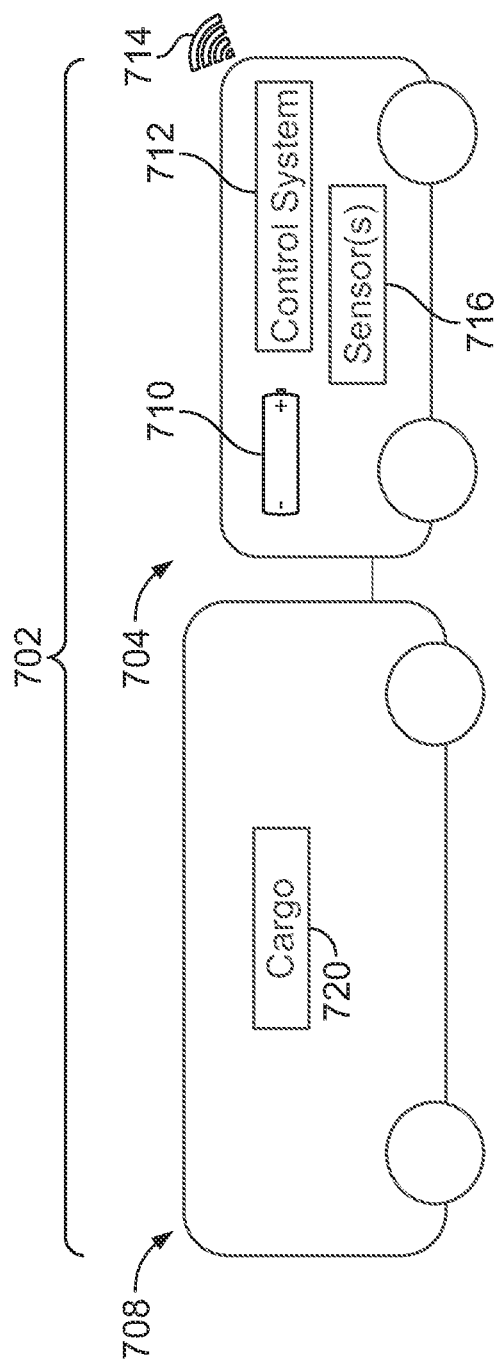
FIG. 7 illustrates one example of a vehicle system.

FIG. 7 illustrates one example of a vehicle system 702. The vehicle system can represent one or more of the vehicle systems shown in FIG. 1. The vehicle system includes an energy tender and a cargo vehicle 708. Alternatively, the vehicle system may include a single or multiple energy tenders and/or a single or multiple cargo vehicles. The energy tender optionally can be referred to as a tender vehicle. The energy tender is a vehicle that carries one or more power sources 710, such as one or more onboard energy storage devices. (The energy tender may be a self-propelling vehicle; in another aspect, the energy tender is moved by other vehicles, i.e., not self-propelling.)

These energy storage devices can be distinct from common vehicle batteries. A common battery may be a lead acid vehicle or marine battery that is sized and configured to turn over an engine starter and possibly provide for a limited amount of auxiliary load energy for a short period of time. But, such a common battery is unable to power a traction motor to propel the vehicle or to otherwise continuously provide power to vehicle systems and subsystems. In contrast, an energy storage device can power one or more traction motors for propelling the vehicle, and/or to supply an auxiliary load for more than bare functionality or for more than a short while. The energy storage devices can be coupled to a dynamic braking system to charge in response to a dynamic braking event using traction motors. Examples of energy storage devices include a lithium ion cell array, a sodium metal halide cell array, a sodium sulfur cell array, a nickel metal hydride cell array, a nickel cadmium cell array, or an array of ultracapacitors. Optionally, one or more of the power sources can be fuel tanks, such as containers that hold a liquid and/or gaseous fuel that is consumed by an engine that works to propel the vehicle. Examples of fuel can include gasoline, diesel fuel, natural gas, compressed air, or the like.

In one embodiment, the vehicle in the vehicle system can carry cargo or not carry cargo. For example, the vehicle may hold cargo (products, people, materials for manufacturing products, etc.) for transporting between two or more locations. Optionally, the vehicle may not hold any cargo, but may instead hold power sources for powering another vehicle. The vehicle in the vehicle system may be capable of self-propulsion in that the vehicle includes one or more devices capable of generating propulsion for moving the vehicle. In contrast, a vehicle 704 may not be capable of self-propulsion in that the vehicle does not include any device that is capable of generating such propulsion. One vehicle in the vehicle system may have power sources onboard the vehicle, or may not include any power sources onboard (but may receive power from power sources onboard another vehicle). For example, the vehicle may include one or more onboard devices capable of providing electric power, such as one or more batteries, combinations of engine and generator (or alternator), etc. Alternatively, the vehicle may not include any such onboard devices that are capable of providing electric power. In the illustrated example, the vehicle holds the power sources that power the propulsion-generating devices (e.g., motors) onboard the other vehicle.

The cargo vehicle can include a vehicle control system 712 that controls movement of the cargo vehicle. The vehicle control system can represent hardware circuitry that includes and/or is connected with one or more processors (e.g., one or more field programmable gate arrays, one or more microprocessors, one or more integrated circuits, etc.) that control operation of the cargo vehicle. The vehicle control system can autonomously control movement of the vehicle (and, optionally, the vehicle while the vehicles are coupled). Alternatively, the vehicle control system can control movement of the vehicle based on input provided by an operator onboard the vehicle and/or the vehicle. Optionally, the vehicle control system can control movement of the vehicle autonomously and based on input provided by an operator onboard the vehicle and/or the vehicle (e.g., by operating in an autonomous control mode during some time periods and operating in a manual control mode during other time periods). As another example, the vehicle control system can control movement of the vehicle based on input provided by an operator off-board the vehicle system or vehicles (e.g., using a remote control device). The vehicle control system optionally includes wireless communication devices that allow for wireless communication 714 with other vehicles, with an off-board remote control device, with the control system, or the like. These devices can include antennas and associated transceiving hardware. The vehicle can include sensors 716, such as cameras, to assist the control system and/or the operator(s) with controlling movement of the vehicle. Suitable sensors may be disposed onboard the vehicle and/or offboard the vehicle.

The vehicle can carry cargo 720 along trips, as described herein. Optionally, the energy tender can carry at least some of the cargo. In one embodiment, the energy tender does not carry any of the cargo, e.g., the energy tender is cannot carry cargo and is incapable of carrying cargo.

The control system (e.g., the scheduling module of the scheduling system) shown in FIG. 3 can schedule and/or otherwise control movements of the vehicles to increase the efficiency by which cargo is moved throughout the transportation network. This increase in efficiency can be represented by more cargo arriving at scheduled destination locations at or before a scheduled arrival time, decreased travel times for the cargo between locations, reduced amounts of electric energy or fuel being consumed to move the cargo, etc. In one embodiment, the control system examines the type, category, or class of cargo (e.g., determines that the cargo is), determines a mass to be moved (e.g., the mass of the vehicle system and/or of the cargo carried by the vehicle system), and determines a trip over which the vehicle system (and optionally the cargo) travels. The details of the trip that are determined can include the routes over which the vehicle system is to travel, a starting location of the trip, a final destination location, and/or one or more intermediate locations between the starting and destination locations. This information can be obtained from a trip manifest provided or otherwise input to the control system. From this information, the control system can calculate or estimate the tractive effort required to complete the trip. This tractive effort may be determined based at least in part on prior trips of other vehicle systems, based on physics-based models of the vehicle system, cargo, and routes, or otherwise determined.

The control system can then determine how much energy is available to propel the vehicle system. This available energy can be determined based on how much energy is stored in the power sources onboard the vehicle (s) located at the starting location of the trip. Optionally, the available energy can be determined based on how much energy is stored in power sources onboard other vehicles not located at the starting location of the trip. As described herein, these other vehicles can couple with the vehicle system en route between the starting and destination locations of the trip. This other available energy can be determined based on the amount of energy stored in the power sources on vehicles in other locations, the locations of these vehicles (e.g., taking into account how much energy would be dissipated or otherwise consumed by moving these vehicles to a location where these vehicles can join the vehicle system). The control system can then generate and send control signals relating to movement of the energy tenders for coupling with some combination of the vehicles that self-propel and that carry cargo.

Figure 8:
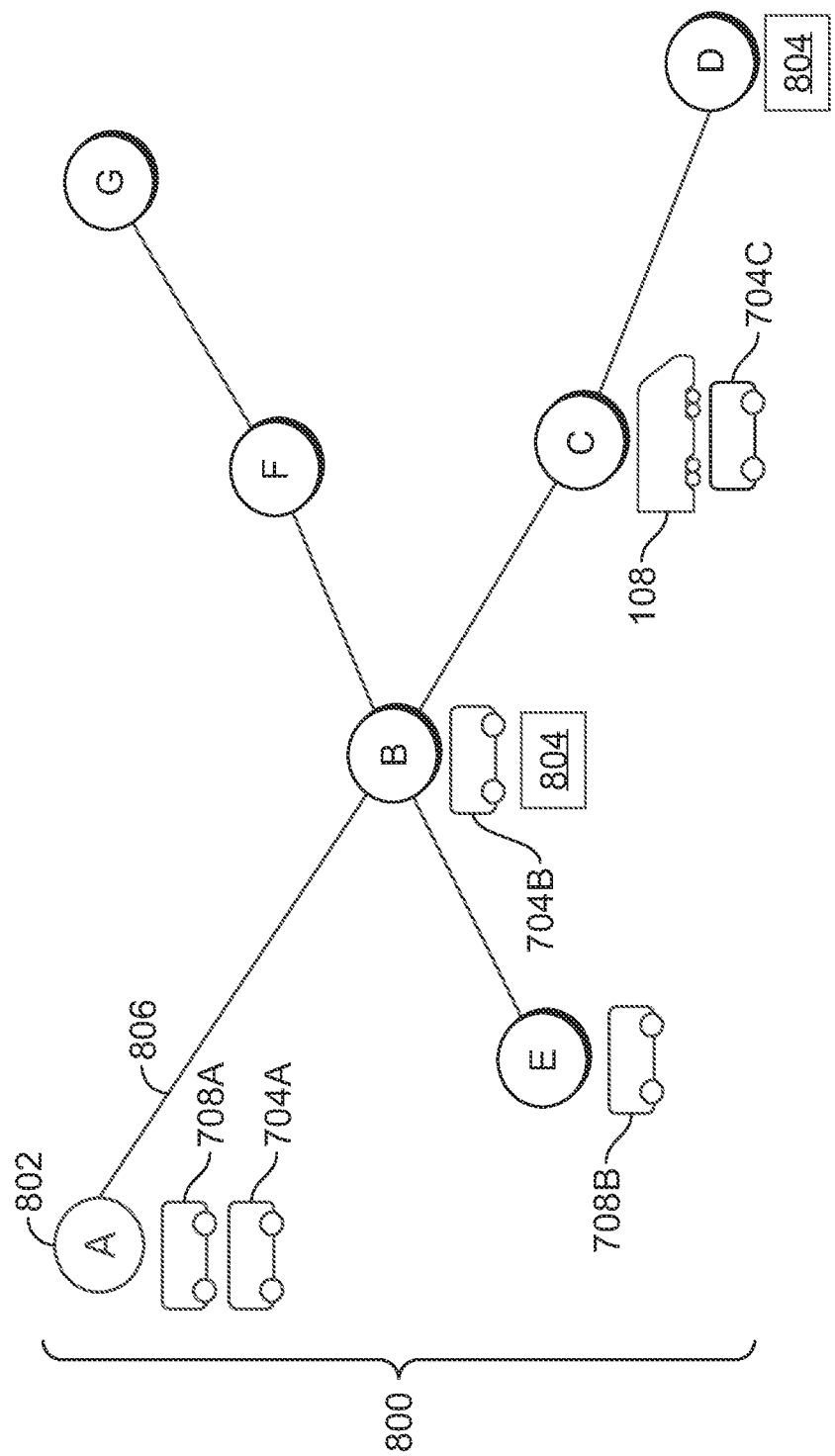
FIG. 8 illustrates one example of a transportation network.

FIG. 8 illustrates one example of a transportation network 800. The transportation network can represent the network shown in FIG. 1, part of the network, a larger network that includes the network, or a different, separate network. The network is formed by several routes 806 (which can represent the routes) that connect or intersect with each other at various locations 802 (e.g., locations A-G in FIG. 8). The locations can represent vehicle yards, rail sidings, intersections, parking lots, garages, or the like. With respect to garages, these can include locations (e.g., buildings) in which vehicles can be housed over a period of time, such as overnight, for several days, etc.

With continued reference to the network shown in FIG. 8, the scheduling module selects one or more energy tenders in the transportation network to couple with the cargo vehicle to move the cargo for the duration of a trip or set of trips to a destination location. The scheduling module can select the energy tenders to include in the various vehicle systems by communicating control signals to the vehicle control systems. These control signals can direct the cargo vehicles to move to locations where the energy tenders can couple with cargo vehicles to form vehicle systems. Optionally, the control signals can cause the vehicle control systems to present instructions to operators of the cargo vehicles on where to move the energy tenders to join with the cargo vehicles in the vehicle systems. Optionally, the energy tenders may be selected based on existing locations of the energy tenders relative to the trip or route (i.e., where the tenders are currently located), and/or the control signals may relate to controlling other vehicles for moving the energy tenders to the locations where the energy tenders can couple with the cargo vehicles to form vehicle systems. In one embodiment, the cargo vehicles that move are powered by one or more other energy tenders and/or are moved by one or more other vehicles.

The scheduling module can communicate with the optimizer module to determine the tractive effort needed to move the cargo along the route(s) 106 between locations A-G in the transportation network. The scheduling module can determine what energy tenders are available in the transportation network, where the available energy tenders are located within the transportation network, what other propulsion-generating vehicles are available (and where) in the transportation network, and/or a state of charge of the power sources onboard the energy tenders. Based on this information, the scheduling module can determine which energy tenders are to power the cargo vehicle, whether any propulsion-generating vehicles other than the vehicles are to help move the cargo vehicle, which stretches or portions of the routes that the different energy tenders are to power the cargo vehicle, and/or which stretches or portions of the routes 806 that the propulsion-generating vehicles are to push or pull the cargo vehicle.

For example, the scheduling module can determine that a first energy tender A is to connect with and power the axles 722 of a cargo vehicle A from a starting location 802A to a first intermediate location 802C between the starting location 802A and a destination location 802D. The scheduling module can determine that a second energy tender B at a second location 802B is to couple with the cargo vehicle A and the first energy tender A to provide additional power to the vehicle system formed from the vehicles A,B,A. This additional power can be used to power the axles of the cargo vehicle A and/or to charge power sources of the first energy tender A. For example, during movement from the location 802B to the location 802C and/or the location 802D, the power sources onboard the second energy tender B can recharge one or more of the power sources onboard the first energy tender A while powering the axles of the cargo vehicle A. Optionally, the second energy tender B can couple with the cargo vehicle A and the first energy tender A to receive power from the first energy tender A to charge one or more power sources of the second energy tender B during movement from the location 802B to the location 802C and/or 802D.

The scheduling module can determine that the first energy tender A and/or the second energy tender B are to separate from the vehicle system at a third location 802C while a propulsion-generating vehicle 108 (e.g., a locomotive) couples with the cargo vehicle A (and optionally the second energy tender B) to propel (e.g., push or pull) the cargo vehicle A to the destination location 802D. The scheduling module can determine additional changes of the energy tenders and/or vehicles 108 to join the vehicle system to move the cargo toward the destination location at or before the scheduled arrival time. For example, a variety of different combinations of various vehicles 108, can be used to push, pull, or provide power to the cargo vehicle along a trip of the cargo vehicle.

The scheduling module can determine which energy tenders (and/or other vehicles 108) are to couple and move with the cargo vehicle at various locations and/or times during a trip of the cargo vehicle based on states of charge of the energy tenders. In one embodiment, the state of charge of an energy tender is the amount of electric energy stored in the power sources of the energy tender. For example, an energy tender having a full state of charge may have more energy stored onboard the energy tender than when the energy tender has half of a state of charge. The scheduling module can examine the locations of the energy tenders and the current states of charge of the energy tenders to determine which of the energy tenders have enough stored energy to power a cargo vehicle over at least part of a trip. Optionally, the state of charge can be an amount of fuel onboard the energy tender. For example, while the description focuses on a state of charge being monitored, alternatively, the amount of fuel remaining onboard an energy tender can be monitored.

In one embodiment, the energy tender can transfer fuel to the cargo vehicle. For example, the energy tender and cargo vehicle can couple with each other by fluidly coupling fuel storage tanks onboard each of the energy tender and the cargo vehicle with one or more conduits (e.g., hoses). Fluid fuel (e.g., liquid and/or gaseous fuel) can be transferred from the energy tender to the cargo vehicle to ensure that the cargo vehicle has enough fuel to power the cargo vehicle to an upcoming location, as described herein. Optionally, two or more energy tenders can fluidly couple with each other to transfer fuel between the energy tenders.

The scheduling module can strategically change out an energy tender having a significant amount of stored energy from a vehicle system at a mid-way location during a trip. Similar to the example described above, upon arrival of a first vehicle system at an intermediate location 802B of a trip (between a starting location 802A and a destination location 802D of the trip), a first energy tender A may have enough remaining stored energy to continue powering a first cargo vehicle A in the first vehicle system to a further location 802C in the trip or the destination location 802D of the trip. But, the scheduling module may direct the first energy tender A to be decoupled from the first cargo vehicle A and removed from the first vehicle system at the intermediate location 802B. Optionally, the scheduling module can direct the first cargo vehicle to couple with a second energy tender B in the first vehicle system at this intermediate location 802B and receive power from the second energy tender B toward or to the destination location. The first energy tender A may then fully or at least partially recharge at the intermediate location 802B before coupling with a second cargo vehicle B in a second vehicle system.

For example, a charging station 804 may be located at the intermediate location 802B. This charging station can include energy storage devices (e.g., batteries), a connection to an electric utility grid, a connection to another power source (e.g., solar panels, turbine engines, wind turbines, or the like), etc. The power sources onboard the first energy tender A can connect with the charging station (e.g., using cables) to charge the power sources of the first energy tender A.

This second vehicle system may be moving a second cargo vehicle B from another location 802E to the location 802F or 802G through the location 802B. The first energy tender A can couple with the second cargo vehicle B at the location 802B and move with the second cargo vehicle B to power the axles of the second cargo vehicle B to the location 802F and/or the location 802G. Optionally, the scheduling module can direct the second cargo vehicle B to couple with the first energy tender A at the location 802B and proceed as the second vehicle system without recharging the first energy tender A or without fully recharging the first energy tender A at the location 802B.

The scheduling module can select the energy tenders to provide power to a cargo vehicle, select the locations where the energy tenders couple with and/or hand off the cargo vehicle, and the like, so that the cargo is delivered to a destination location. For example, the scheduling module can select energy tenders that are not fully charged to couple with a cargo vehicle responsive to the cargo vehicle being ahead of schedule. The scheduling module can direct the cargo vehicle A to remain at the location 802B with a partially charged energy tender B while the partially charged energy tender B fully or at least partially re-charges. The scheduling module can direct the cargo vehicle A to remain in this holding pattern even if the additional charge is not needed for the energy tender B to power the cargo vehicle A over the remainder of the trip from the location 802A to the location 802D via the location 802B. As another example, the scheduling module can direct the cargo vehicle A to remain at the location 802B even if the additional charge is not needed for the energy tender B to power the cargo vehicle A over an upcoming leg of the trip (e.g., the leg extending from the location 802B to the location 802C). This can delay movement of the cargo vehicle along the trip to avoid needlessly adding to the congestion of the transportation network, while ensuring that the cargo arrives within the designated time slot.

The scheduling module can direct an energy tender to be moved to another location for charging the energy tender. For example, the power sources onboard the energy tender C at the location 802C may be depleted of energy or may not have sufficient stored energy to allow the energy tender C to power a vehicle to move the energy tender C to another location (e.g., the location 802B and/or the location 802D). During a trip of the energy tender B from the location 802B to the location 802D through the location 802C (which may involve the energy tender B powering a cargo vehicle), the scheduling module can direct the energy tender B to connect with and power the same or other cargo vehicle to push the energy tender C, pull the energy tender C, and/or provide electric power to the energy tender C so that the energy tender C is moved from the location 802C to the location 802D or the location 802B to recharge the power sources of the energy tender C. This can be referred to as the energy tender C receiving a free ride from the energy tender B and at least one cargo vehicle to a location 802 where the power sources of the energy tender C can be recharged.

The scheduling module optionally can coordinate the concurrent or simultaneous movement of multiple energy tenders in the transportation network to ensure that the proper amount of energy is provided to the cargo vehicles for powering the cargo vehicles to self-propel to the destination locations of the cargo vehicles. This coordination can involve the scheduling module directing one or more energy tenders to couple with a vehicle system on a route 806 between the locations. For example, the scheduling module can direct an energy tender to power a cargo vehicle to approach a moving vehicle system from behind (e.g., while the energy tender, cargo vehicle, and the vehicle system are moving in the same direction on a route 806) and coupling with the vehicle system to join the vehicle system and provide additional energy or fuel to the cargo vehicle (s) in the vehicle system. This coupling can occur while the vehicle system is moving along the route 806 or can occur with the vehicle system stopping on the route 806 for the coupling to occur. As another example, the scheduling module can direct an energy tender to power a cargo vehicle and approach a moving vehicle system from ahead (e.g., while the energy tender and the vehicle system are moving in opposite directions on a route 806) and coupling with the vehicle system to join the vehicle system and provide additional energy or fuel to the cargo vehicle (s) in the vehicle system.

The scheduling module can communicate with the energy management system to determine energy requirements for moving a cargo vehicle between locations during a trip. The energy requirement can be calculated by the energy management system based on vehicle characteristics (e.g., the weight, mass, height, etc.) of the cargo, route characteristics (e.g., the grades and/or curvatures of the route 806), schedule characteristics (e.g., the speeds at which the vehicle systems are to travel to arrive at a location within a scheduled time slot, as described above), or the like. For example, the energy management system can calculate that more energy is needed for heavier cargo, taller cargo (e.g., due to wind drag), inclined grades, curved sections of the routes 806, faster speeds, etc. The energy management system can calculate that less energy is needed for lighter cargo, shorter cargo, flat or downhill grades, straighter sections of the routes 806, slower speeds, etc. The energy management system optionally can determine that more or less tractive effort (and therefore power) is needed depending on weather conditions or other ambient conditions. For example, the presence of ice, snow, or leaves on a route may require more power to propel a cargo vehicle over the route. The scheduling module can then select the energy tenders for including in a vehicle system during different legs (e.g., portions) of a trip with one or more cargo vehicles to ensure that the vehicle system has enough stored energy within the vehicle system over the different legs of the trip. In one embodiment, the scheduling module can determine (e.g., from the energy management system) the energy that will be obtained by the energy tenders during movement for charging the power sources. For example, the energy management system can inform the scheduling module of energy that will be gained by the energy tenders from dynamic braking. The amounts of energy gained from dynamic braking may be determined from previous trips of the energy tenders and/or vehicle systems. The scheduling module can reduce the calculated amount of energy needed over some legs of a trip by the amount of energy that will be gained (e.g., stored in the power sources) from this dynamic braking.

The scheduling module can determine the times at which energy tenders are to join or leave vehicle systems having at least one cargo vehicle based on charging rates of the energy tenders. For example, the power sources may re-charge with electric energy at speeds that are dictated by the states of charge of the power sources, at speeds that are controlled or limited by the charging stations 804, and/or at speeds that are based on other factors (e.g., based on loads on the utility grid or system). The scheduling module can determine the times at which energy tenders are to couple or decouple from cargo vehicles based on the charging rates so that the cargo vehicles are not waiting at a location of an energy tender while the energy tender charges to a state needed to complete the next leg of a trip.

Movements of vehicle systems can be coordinated with each other so that the vehicle systems can share stored power with each other. For example, multiple vehicle systems may be scheduled to travel in the same direction on the same route 806 (and optionally to remain no farther than a designated distance from each other) so that an energy tender of one vehicle system can decouple from that vehicle system. This energy tender can then be moved by a cargo vehicle or another vehicle to move to another vehicle system and couple with this other vehicle system. This can occur for the energy tender to provide additional energy to the other vehicle system.

The scheduling module can determine which routes 806 are uni-directional routes and which routes 806 are bi-directional routes and create schedules based on this determination. A uni-directional route is a route 806 on which only a single vehicle or vehicle system can travel at a time, such as a single track of a rail network. A bi-directional route is a route 806 on which two vehicles or vehicle systems can travel, such as parallel tracks of a rail network, different lanes of a road, or the like. The coupling of vehicles with each other can be limited based on whether a uni-directional route is occupied, whether a bi-directional route is available, whether a longer transit time to travel a longer path over bi-directional routes allows for a vehicle system to arrive and couple with an energy tender at a desired time, etc.

The scheduling module can determine and use the bandwidth capacities of locations in creating the schedules. For example, the scheduling module can determine how many energy tenders and/or cargo vehicles can remain at a location 802 and create the schedules so that no more vehicles than the capacity of the location are held at that location at any time.

The time needed for energy tenders to travel between locations can be determined and used by the scheduling module in creating the schedules. For example, if an energy tender is needed at another location 802 from a current location 802 of the energy tender, the scheduling module can factor in the transit time needed for the energy tender to travel to the other location in creating the schedule. This can involve the scheduling module delaying arrival of the cargo vehicle at the other location until the energy tender arrives at the other location and/or is charged to at least a selected or designated state of charge.

Figure 9:
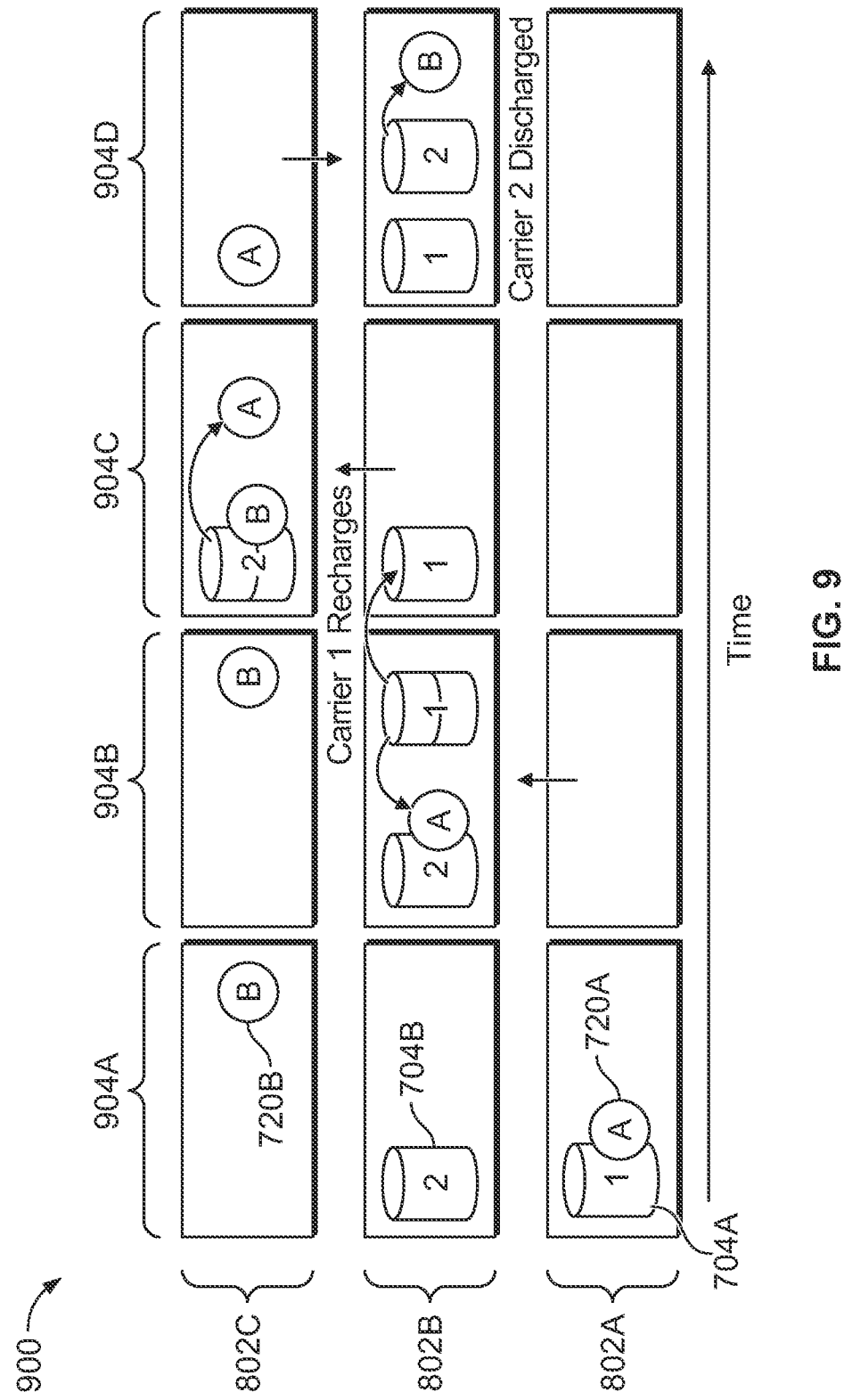
FIG. 9 illustrates one example of a movement schedule generated by the scheduling module shown in FIG. 3.

FIG. 9 illustrates one example of a movement schedule 900 generated by the scheduling module. This movement schedule is shown as a grid or matrix with each row representing a different location 802 in the transportation network and each column representing a different scheduled time 904A-D. In the illustrated example, the locations are locations 802A, 802B, 802C, but optionally can be other locations in the transportation network. The scheduled times 904 are shown as scheduled times 904A-D, with the time 904A occurring before the time 904B, which occurs before the time 904C, which occurs before the time 904D.

The schedule 900 is established to move a first cargo ("A" in FIG. 9) from the first location 802A to the third location 802C in the transportation network and to move a second cargo ("B" in FIG. 9) from the third location 802C to the second location 802B in the transportation network. The first cargo can be referred to as the cargo A and the second cargo can be referred to as the cargo B. In this example, the locations 802A, 802B are the same distance apart from each other as the locations 802B, 802C. As a result, the time needed for a vehicle system formed by a single energy tender and a single cargo vehicle (carrying the cargo A or the cargo B) to travel from the location 802A to the location 802B is the same as each of (a) the time needed for the vehicle system to travel from the location 802B to the location 802C, (b) the time needed for the vehicle system to travel from the location 802C to the location 802B, and (c) the time needed for the vehicle system to travel from the location 802B to the location 802A. Additionally, in the illustrated example, the amount of electric energy or fuel required to propel a vehicle system formed from one energy tender and one cargo vehicle to move (a) from the location 802A to the location 802C, (b) from the location 802B to the location 802A or 802C and then back to the location 802B, (c) from the location 802C to the location 802B and then back to the location 802B, and so on, fully depletes the energy or fuel stored in the energy tender having power sources 701 that are fully charged or full of fuel before beginning the trip.

The scheduling module may determine that it takes one hour for a vehicle system formed from a single energy tender and a single cargo vehicle between any two neighboring locations (e.g., locations that are not separated from each other by another location 802). The scheduling module may be notified (e.g., from an operator, from a pre-existing delivery schedule, from a manifest document, etc.) that the cargo A is to be delivered to the location 802C (from the location 802A) in about (e.g., within 10%) two hours and the cargo B is to be delivered to the location 802B (from the location 802C) in about three hours. The scheduling module may be instructed or have a default requirement that at least one of the energy tenders be fully charged or full of fuel at the completion of delivery of the cargo 720A, 720B for delivery of additional cargo.

Based on the locations of the cargo A, 720B and the energy tenders, the scheduling module determines that an optimal schedule for delivery of the cargo A, 720B involves a cargo switch at location 802B. Specifically, at the first time 904A, a fully charged first energy tender A connects with and powers a first cargo vehicle A (having the cargo A onboard) in a first vehicle system at the location 802A, a fully charged second energy tender B is located at the location 802B, and a second cargo vehicle B (having the cargo B onboard) is located at the location 802C. While the first energy tender A has enough stored energy to power the first cargo vehicle A to take the cargo A all the way to the scheduled destination location. But, doing this would incur the cost of charging or re-fueling the first energy tender A at the location 802C. This would result in the cargo B not being delivered to the location 802C on time. Instead, the scheduling module directs the first energy tender A to power the first cargo vehicle A to take the cargo A from the location 802A to the location 802B (at time 904B, which is one hour after starting movement).

The first energy tender A is then separated from the first cargo vehicle A having the cargo A at the location 802B and the second energy tender B couples with the first cargo vehicle A. The second energy tender B then powers the first cargo vehicle A to take the cargo A from the location 802B to the location 802C from the time 904B to the time 904C to complete delivery of the cargo A. The power sources onboard the first energy tender A fully recharge or re-fuel during the time between the times 904B, 904C (while the second energy tender B completes delivery of the cargo A).

The second energy tender B has half-charged or half depleted power sources at the time 904C when the second energy tender B couples with the second cargo vehicle B. The second energy tender B then powers the second cargo vehicle B to take the second cargo B to the location 802B from the time 904C to the time 904D. The second energy tender B then arrives at the location 802B at or around the time 904D to deliver the cargo B at the location 802B. Additionally, the first energy tender A has fully charged or fully fueled power sources, as required.

Figure 10:
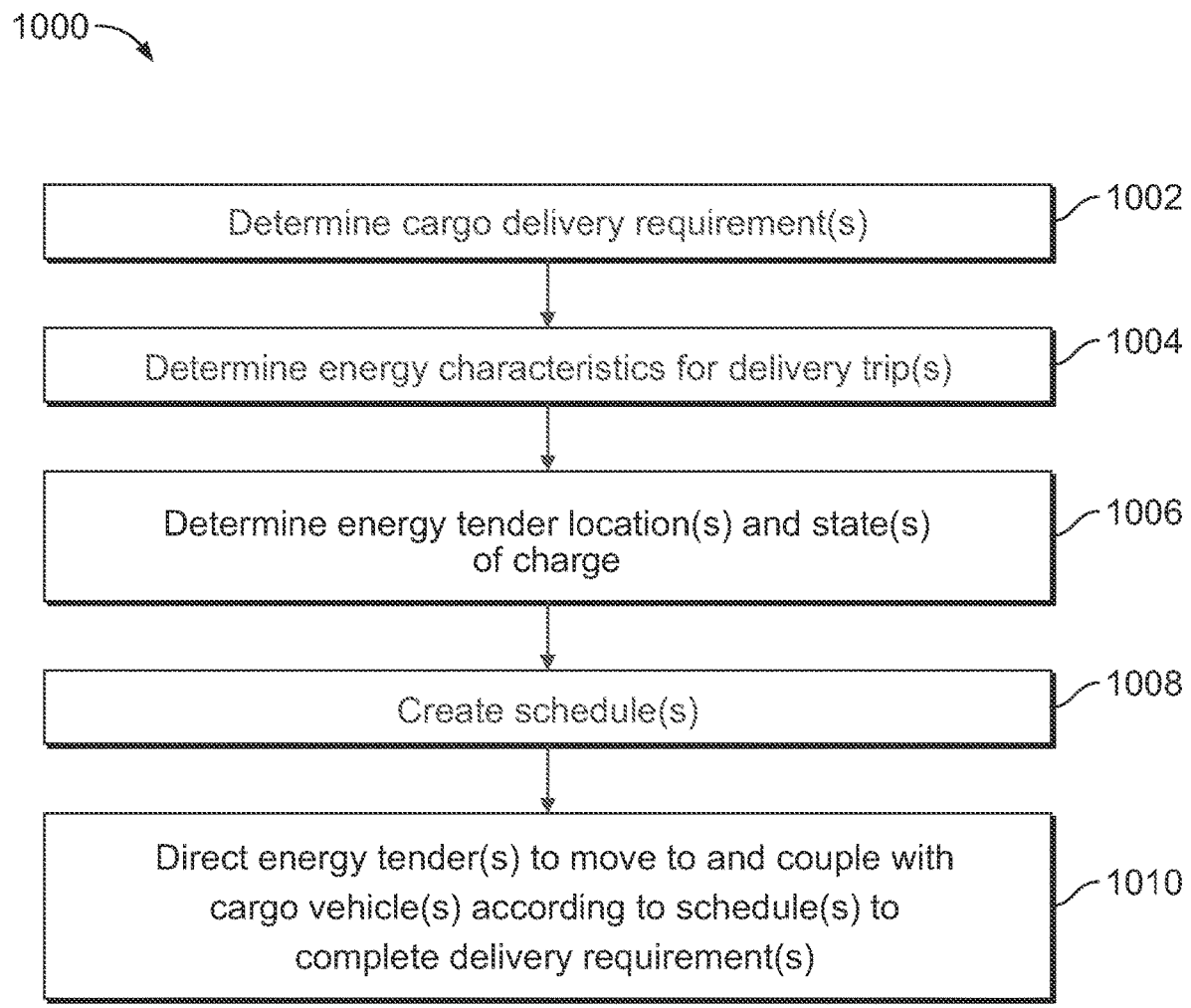
FIG. 10 illustrates a flowchart of one embodiment of a method for scheduling/controlling movements of energy tenders in a transportation network to provide for on-time delivery of cargo.

FIG. 10 illustrates a flowchart of one embodiment of a method 1000 for scheduling movements of energy tenders in a transportation network to provide for on-time delivery of cargo. Optionally, the flowchart can show a method for controlling the movements of the energy tenders in the transportation network to provide for on-time delivery of the cargo. The method can represent the operations or algorithm(s) performed by the scheduling module to determine how or where to move energy tenders in a transportation network to ensure that the cargo vehicles are powered to deliver cargo on time (within designated time slots). At step 1002, one or more cargo delivery requirements may be determined. The cargo delivery requirements may dictate which cargo is to be delivered, where the cargo is located, the location to where the cargo is to be delivered, and when the cargo is to be delivered (e.g., designated time slots for delivery of the cargo). Additional delivery requirements can include restrictions on which routes 806 can be traveled during delivery of the cargo. Some cargo may be too fragile or susceptible to damage to travel on some routes 806 and some cargo may contain hazardous material that is not legally permitted to travel on some portions of routes. The cargo delivery requirements can be input into the scheduling module via the user interface shown in FIG. 3, may be obtained by the scheduling module from one or more trip manifests or delivery contracts, or the like.

At step 1004, one or more energy characteristics for one or more trips to deliver the cargo may be determined. The energy characteristics can represent how much energy is needed or will be needed to deliver the cargo to the delivery or destination location(s) within the designated time slots. For example, the energy characteristics can include how quickly electric energy stored onboard an energy tender will be depleted by powering a cargo vehicle carrying the cargo over one or more legs of the trip. This characteristic can be referred to as a depletion rate. The depletion rate optionally can represent how quickly fuel or other source of energy will be depleted by powering a cargo vehicle carrying the cargo over one or more legs of the trip. The scheduling module can determine the depletion rate based on previous trips of the same or other energy tenders and cargo vehicles on the routes 806, based on characteristics of the routes 806 (e.g., grades, curvatures, etc.), characteristics of the cargo (e.g., size, weight, mass, etc.), and/or weather conditions (e.g., wind direction and/or speed). For example, the scheduling module can determine that the depletion rate is faster for uphill grades, curved routes 806, heavier and/or larger cargo, stronger headwinds, etc., and can determine that the depletion rate is slower for flatter or downhill grades, straighter routes 806, lighter and/or smaller cargo, weaker headwinds, stronger tailwinds, etc. Another energy characteristic can be how quickly the power sources onboard energy tenders can be re-charged or re-filled. This characteristic can be referred to as a recharging or replenishment rate, and can be determined based on locations of charging stations 804, rates at which the charging stations 804 can supply current or fuel to the power sources, downhill locations along the routes 806 where dynamic breaking can be used to recharge the power sources, etc.

The scheduling module can determine how much energy is needed for a trip to deliver cargo within the designated time slot based on the energy characteristics, as well as the current locations of the energy tenders, the current locations of the cargo vehicles, delivery locations, and/or the current locations of charging stations 804. The energy needed for a trip can increase for trips involving faster depletion rates, slower recharging rates, energy tenders having to travel farther to couple with cargo vehicles, cargo vehicles having to travel farther to deliver cargo, etc. The energy needed for a trip can decrease for trips involving slower depletion rates, faster recharging rates, energy tenders having to travel shorter distances to couple with cargo vehicles, cargo vehicles having to travel shorter distances to deliver cargo, etc. The energy needed for a trip can be referred to as an energy demand of a trip.

At step 1006, the location of one or more of the energy tenders in the transportation network may be determined. The locations of the energy tenders can be determined by the vehicle control systems onboard the energy tenders communicating locations of the energy tenders to the scheduling module via the communication system. The state of charge of one or more of the energy tenders may be determined. As described above, the vehicle control systems can communicate the states of charge of the energy tenders to the scheduling module (e.g., via the communication system).

At step 1008, the schedule for delivery of cargo by one or more vehicle systems formed from at least one energy tender and at least one cargo vehicle may be determined. The schedules can be determined by the scheduling module based on the cargo delivery requirements, the energy demands for the delivery trips, the locations of the energy tenders, the states of charge or fueling of the energy tenders, etc. As described above, the scheduling module can determine the schedules that direct different energy tenders to power cargo vehicles over part, but not all, of a delivery trip before handing the cargo vehicle to another energy tender, energy tenders obtaining free rides to charging stations 804 or another location, different types of vehicles traveling with or in a vehicle system, vehicle systems coupling to share power from the power sources, etc.

At step 1010, one or more energy tenders may be directed to be moved to and/or couple with cargo vehicles according to the determined schedules to complete delivery requirements. The scheduling module can communicate control signals (e.g., via the communication system) to the vehicle control systems of cargo vehicles. These control signals can direct the control systems to autonomously (e.g., without operator intervention) control movement of the cargo vehicles (as powered by the energy tenders) according to the schedules or can direct the control systems to provide instructions to operators onboard the cargo vehicles to direct the operators how to move the cargo vehicles according to the schedules. The cargo vehicles can then be powered by the energy tenders to move according to the schedules so that the cargo is or are delivered within the designated time slot(s) according to the schedules.

In an embodiment, a control system includes one or more processors. The one or more processors may be electrically coupled and/or otherwise in communication with (e.g., wireless communications) one or more communication devices, sensors, on-board vehicle control systems, etc. The one or more processors are configured to determine an energy demand associated with delivery of cargo in each of one or more trips from a starting location to a delivery location within a delivery time slot associated with the trip. The energy demand for each trip is representative of an amount of electric energy needed to move one or more cargo vehicles that carry the cargo in the trip from the starting location to the delivery location of the trip. For example, the amount of electric energy may be the amount of electric energy needed to power the one or more cargo vehicles to self-propel themselves to carry the cargo from the starting location to the delivery location. Alternatively or additionally, the amount of electric energy may be the amount of electric energy needed for one or more other vehicles (e.g., electric locomotives or other non-cargo carrying propulsion-generating vehicles) to move the one or more cargo vehicles from the starting location to the delivery location; for example, the one or more other vehicles may have on-board energy storage devices and/or fuel engines to provide sufficient energy to move themselves. Alternatively or additionally, the amount of electric energy may be the amount of electric energy needed for one or more other vehicles (e.g., electric locomotives or other non-cargo carrying propulsion-generating vehicles) to move both themselves and the one or more cargo vehicles from the starting location to the delivery location. (Either in a given consist or from a transportation network perspective, there may be a mix of self-propelling cargo vehicles, non-cargo carrying propulsion-generating vehicles with on-board energy storage/generation means, and non-cargo carrying propulsion-generating vehicles without on-board energy storage/generation means.) The one or more processors are configured to determine a location of each of one or more energy tenders and a state of charge of each of the one or more energy tenders. The one or more processors are configured to determine a schedule for at least one of the trips to deliver the cargo to the delivery location within the delivery time slot, the schedule determined based on the energy demand, the location of the one or more energy tenders, and the state of charge of the one or more energy tenders. The one or more processors may direct movement of one or more of the energy tenders to move (e.g., to be moved, or to move themselves) to a location of the one or more cargo vehicles (e.g., the energy tenders may be configured for self-propulsion, or they may be moved by other vehicles/means), couple (directly or indirectly) with the one or more cargo vehicles, and supply electric power from the one or more energy tenders for powering movement of the one or more cargo vehicles (e.g., power is supplied to the cargo vehicles to move, and/or to non-cargo carrying vehicles that move the cargo vehicles) along one or more routes to the delivery location of the trip within the designated time slot. In one aspect, movement of the energy tenders is directed for the energy tenders to self-propel to the location of the cargo vehicles, with the energy tenders providing electrical power to the cargo vehicles for the cargo vehicles to self-propel. In another aspect, the energy tenders may be pulled by other vehicles (cargo vehicles configured for both self-propulsion and to pull the energy tenders, or non-cargo carrying propulsion generating vehicles), and/or the energy tenders may provide electrical power to non-cargo carrying propulsion generating vehicles that pull the energy tenders and/or cargo vehicles.

In an embodiment, a control system includes one or more processors configured to determine an energy demand associated with delivery of cargo in each of one or more trips from a starting location to a delivery location within a delivery time slot associated with the trip. The energy demand for each trip is representative of an amount of electric energy needed to power one or more cargo vehicles that carry the cargo in the trip to self-propel the one or more cargo vehicles from the starting location to the delivery location of the trip. The one or more processors are configured to determine a location of each of one or more energy tenders and a state of charge of each of the one or more energy tenders. The one or more processors are configured to determine a schedule for at least one of the trips to deliver the cargo to the delivery location within the delivery time slot. The schedule is determined based on the energy demand, the location of the one or more energy tenders, and the state of charge of the one or more energy tenders. The one or more processors are configured to direct self-propelled movement of one or more energy tenders to move to a location of the one or more cargo vehicles, couple with the one or more cargo vehicles, and supply electric power from the one or more energy tenders to the one or more cargo vehicles for powering the one or more cargo vehicles to self-propel along one or more routes to the delivery location of the trip within the designated time slot.

Figure 11:
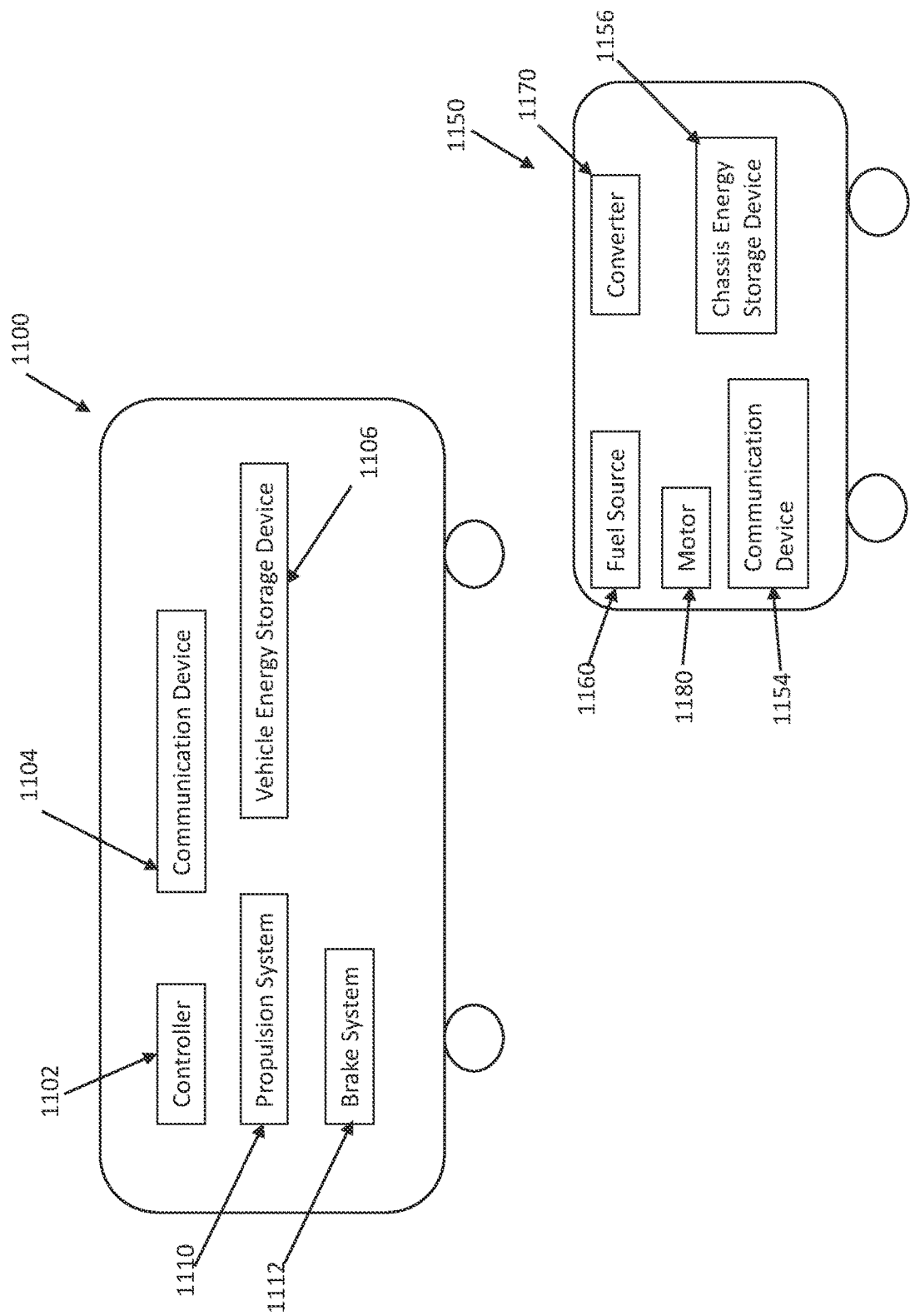
FIG. 11 illustrates one example of a vehicle system and an energy chassis.

FIG. 11 illustrates a vehicle system 1100 and an energy chassis 1150 in accordance with one embodiment. The energy chassis may provide an electric energy to charge or power the vehicle system. The energy chassis may include an onboard fuel source 1160 that may hold a supply of fuel. The supply of fuel may be diesel, gasoline, hydrogen, liquid hydrogen, ammonia, kerosene, dimethyl ether, alcohol, natural gas, or the like.

The energy chassis may include an energy converter 1170. The energy converter may convert at least a portion of the supply of the fuel from the fuel source into electric energy. In one example the energy converter may be one or more of a fuel cell, a proton exchange membrane, a first combination of an engine and a generator, or a second combination of the engine and an alternator. The energy converter may include a fuel cell configured to convert natural gas from the fuel source. In one example, the energy converter may include a proton exchange membrane to convert hydrogen gas supplied from the fuel source.

The energy chassis may include a chassis communication device 1154 that may communicate with the vehicle system. The chassis communication device may communicate with a controller 1102 of the vehicle systems, one or more processors of the vehicle system, or the communication device of the vehicle system. Details of the communication device will be discussed further below.

In one example, the energy chassis may include a motor 1180, for example a propulsion motor. However, in another embodiment, the energy chassis may not have a motor and the energy chassis may be hauled behind a vehicle of the vehicle system. The motor may propel the energy chassis. The motor may be a relatively small motor that may allow movement of the energy chassis at low speeds while not hauling anything. In another embodiment, the motor may be a propulsion motor capable of moving the energy chassis at high speeds and/or hauling a load. In one example, the motor may propel the energy chassis using at least some of the electric energy from the energy converter. The energy chassis may move to the vehicle system to transfer the electric energy to power the vehicle energy storage device.

The energy chassis may include a chassis energy storage device 1156. The chassis energy storage device may include one or more of a battery cell, a fuel cell, a capacitor storage bank, or a flywheel. The chassis energy storage device may include components that allow and/or control the receipt and/or transfer of fuel to and/or from the energy chassis. The chassis energy storage device may store at least some of the electric energy that is generated by the energy converter. The chassis energy storage device may transfer at least some of the electric energy to the vehicle energy storage devices. In one example, the chassis energy storage device may transfer electric energy to a second energy chassis. For example, the second energy chassis may be mobile but may hold less energy than the energy chassis with the chassis energy storage device onboard. Thus, the energy chassis with the chassis energy storage device onboard may serve to charge/power various other energy chassis, that in turn may charge/power vehicles of the vehicle system.

The vehicle system may be a propulsion-generating vehicle such as, but not limited to, a locomotive or other rail vehicle, an automobile, a truck, a bus, a mining vehicle, a marine vessel, an aircraft (manned or unmanned, such as a drone), an agricultural vehicle, or another off-highway vehicle. In the illustrated embodiment, the vehicle system includes plural wheels in contact with a route along which the vehicle system moves. In one or more embodiments, the vehicle system may include two or more vehicles that may travel together (by being mechanically coupled or by being mechanically separate but logically coupled and communicating with each other to travel together, such as in a convoy or a locomotive consist where multiple locomotives communicate and operate together as a train). At least one vehicle of the vehicle system may be a propulsion-generating vehicle, and optionally the vehicle system may include one or more non-propulsion generating vehicles.

The vehicle system includes a controller 1102 disposed onboard the vehicle system. The controller may represent a control module, and can include one or more processors, microcontrollers, or other logic-based devices and/or associated software or instructions, for carrying out one or more operations described herein. The controller controls operations of the vehicle system, such as by controlling tractive efforts and/or braking efforts provided by a propulsion system 1110 (e.g., a traction motor, an engine, or the like) and braking system 1112. The tractive components operably coupled with the propulsion and/or brake systems (e.g., traction motors, brakes such as air brakes, or the like) may control movement of the wheels (and/or axles joined to the wheels, not shown) of the vehicle system to generate tractive efforts to propel the vehicle system along the route. In addition to providing propulsion force to propel the vehicle system, the propulsion and/or brake systems can act to slow or stop movement of the vehicle system using dynamic braking.

The vehicle system includes a communication device 1104. The communication device may be setup for one or both of wired or wireless communication. For example, the communication device can represent transceiving circuitry, one or more antennas, modems, communication cables, or the like. The communication device may communication (e.g., receive and/or provide data signals) with the controller onboard the vehicle system, with an off-board controller (not shown), with other vehicles traveling in a consist with the vehicle system, with other vehicles within a determined area or location, or the like.

The controller may be manually operated by receiving instruction signals from an input device (not shown) (e.g., a device that receives input from an operator such as, but not limited to, a touchscreen, a joystick, a keyboard, a switch, a wheel, a microphone, or the like) based on manually input from an operator at the input device. An output device (not shown) can provide information to the operator, such as current operational settings of the vehicle system, designated operational settings of a trip plan, a current amount of electric energy stored onboard the vehicle system, a current storage capacity of an onboard vehicle energy storage device 1106, or the like.

The vehicle energy storage device may represent one or more energy systems and/or components that store energy used to operate the vehicle system. The energy may be used to provide power to propulsion loads of the vehicle system and/or non-propulsion loads of the vehicle system (e.g., air-conditioning, coach lighting, passenger power outlet supply, or the like). As one example, the energy may be in the form of electric energy. The energy storage device may include electric components that allow and/or control the vehicle energy storage device to receive electric current from a source off-board the vehicle system, for example the energy chassis. In other embodiments, the vehicle energy storage device may receive electric current from an off-board charging station, another vehicle system, or the like.

In one or more embodiments, the vehicle system may include one or more sensors operably coupled with the energy storage device that may measure or sense a state of charge of the energy storage devices on board the vehicle system. The controller may receive the sensed data from the one or more sensors and measure or determine the state of charge of the energy storage device. Additionally, the controller may include one or more sensors operably coupled with the vehicle system that determine a vehicle location of one or more vehicles of the vehicle system. The controller may calculate a needed amount of energy that the vehicle system will need to power the vehicle system to an upcoming location along the route. The controller may determine that the state of charge of the energy storage device is insufficient to power the vehicle system to the upcoming location. In one or more embodiments, the controller may identify a location of the energy chassis, and may control the propulsion and/or braking systems to move the vehicle system to the energy chassis.

The controller may direct which of the vehicles in the vehicle system are to couple with and be powered by the electric energy of the energy chassis based on one or more of: the vehicle locations of the vehicle system, the states of charge of the vehicle energy storage devices, an amount of the supply of the fuel of the energy chassis, and a chassis location of the energy chassis. The controller may direct which of the vehicles of the vehicle system is to be powered by the electric energy of the energy chassis based on an energy demand of the vehicle system. The controller may direct which of the vehicles of the vehicle system is to be powered by the electric energy of the energy chassis based on a charging rate at which the vehicle energy storage device is charged with the electric energy. The controller may direct which of the vehicles of the vehicle system is to be powered by the electric energy of the energy chassis based on a depletion rate at which vehicle electric energy stored in the vehicle storage device is discharged to power the vehicle system.

Alternatively, the controller may determine whether the energy chassis may be within a determined proximity (e.g., within 1 mile, within 5 miles, within 50 miles, within 100 miles or the like). If the energy chassis is within the determined proximity, the controller may control operations of the vehicle system to move the vehicle system toward the energy chassis. In one example, the controller may determine that the vehicle energy storage device does not have sufficient charge to reach the energy chassis. The vehicle system and the energy chassis may communicate and direct the energy chassis to move toward the vehicle system in order to meet the vehicle system along the route.

In one embodiment, the communication device of the vehicle system may can interact with other systems, for example the chassis communication device. The communication devices may communicate via one or more communication types. Suitable communication types can include, but are not limited to, cellular networks (e.g., the Global System for Mobile Communications (GSM)), mesh networks using Ethernet standards, wireless communication protocols (e.g., Bluetooth), radio and shortwave communication types, or the like. In one or more embodiments, where two or more communication types are present, the communication device may translate some or all of a data stream from one type to another. Similarly, different data protocols may be used. Such translation may allow the communication device to act as a transference point for data transmission. The translation may allow for different types of equipment (e.g., first and second vehicle systems may each use communication types different from each other to communicate with each other via the communication system). The communication device may switch types, protocols, and/or communication pathways in response to delegation of signal or failure of one pathway. This may provide redundancy of communication by the communication system. In one embodiment, the communication device may decrypt, decompile, or disaggregate information, parse information, and send along all or part of a message (e.g., alone or combined with new data, or with encryption, or both). The communication device may be the same as or similar to other communication devices or communication systems described herein.

Figure 12:
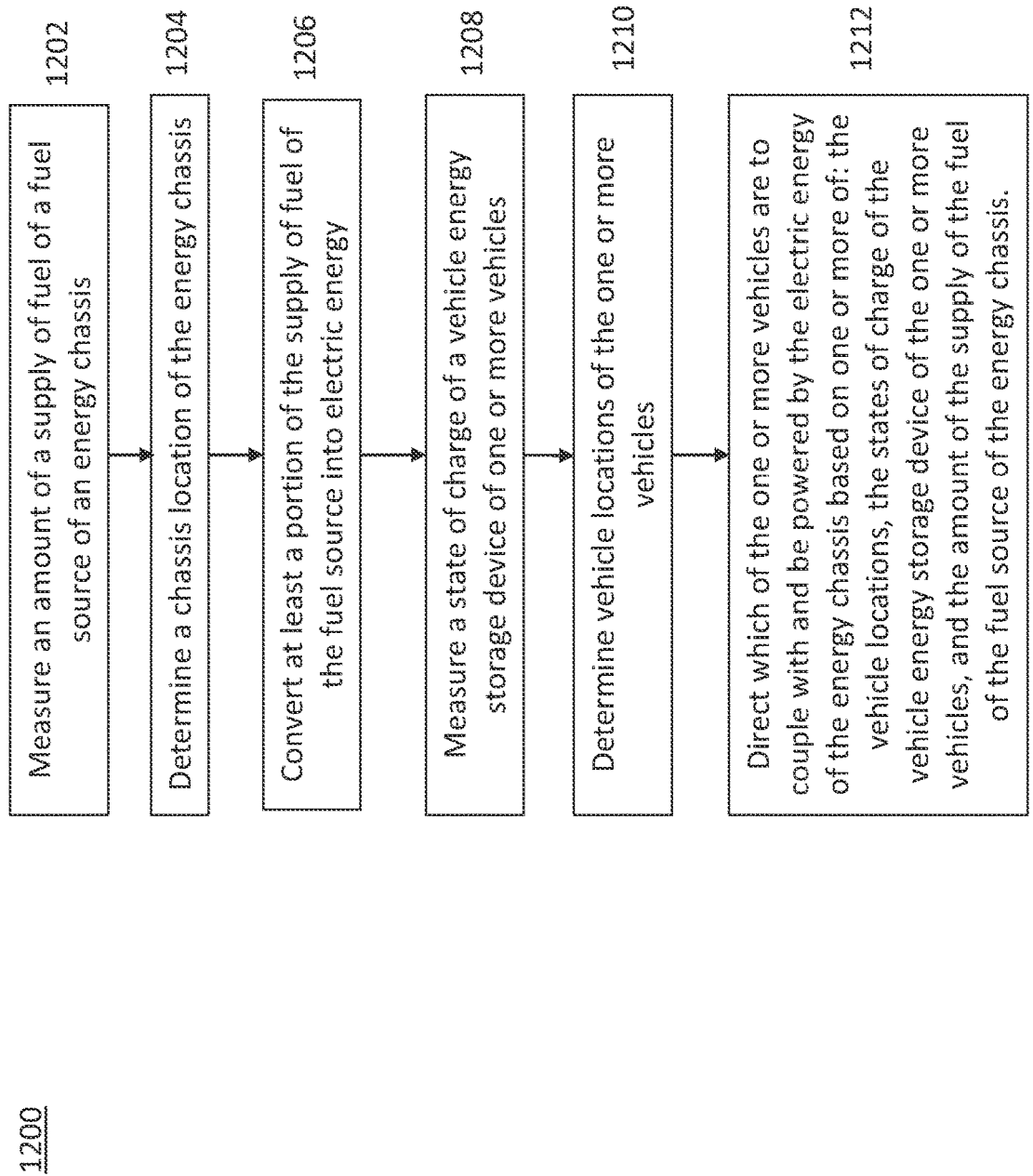
FIG. 12 is a flowchart of an embodiment of a method for a control system of a vehicle system and an energy chassis.

FIG. 12 illustrates a flowchart 1200 of one example of a method of directing energy between an energy chassis and one or more vehicles of a vehicle system, in accordance with one embodiment. At step 1202, the method may include measuring an amount of a supply of fuel of a fuel source of an energy chassis. The supply of fuel may be diesel, gasoline, hydrogen, liquid hydrogen, ammonia, kerosene, dimethyl ether, alcohol, natural gas, or the like. The amount of the supply of fuel of the fuel source may be determined by one or more sensors.

At step 1204, the method may include determining a chassis location of the energy chassis. The chassis location may be determined by one or more sensors.

At step 1206, the method may include converting at least a portion of the supply of fuel of the fuel source into electric energy. In one example, an energy converter converts the portion of the supply of fuel of the fuel source into electric energy. In one example the energy converter may be one or more of a fuel cell, a proton exchange membrane, a first combination of an engine and a generator, or a second combination of the engine and an alternator. The energy converter may include a fuel cell configured to convert natural gas from the fuel source. In one example, the energy converter may include a proton exchange membrane to convert liquified natural gas supplied from the fuel source.

At step 1208, the method may include measuring a state of charge of a vehicle energy storage device. In one example, the state of charge of the vehicle energy storage device may be measured by one or more sensors operably coupled with the vehicle energy storage device.

At step 1210, the method may include determining vehicle locations of the one or more vehicles of the vehicle system. The vehicle locations may be determined by one or more sensors.

At step 1212, the method may include directing which of the one or more vehicles are to couple with and be powered by the electric energy of the energy chassis based on one or more of: the vehicle locations, the states of charge of the vehicle energy storage device of the one or more vehicles, and the amount of the supply of the fuel of the fuel source of the energy chassis.

In one embodiment, a control system is provided that includes one or more processors that may determine vehicle locations of one or more vehicles and states of charge of vehicle energy storage devices onboard the one or more vehicles. The control system may include an energy chassis having a fuel source holding a supply of fuel, an energy converter to convert at least a portion of the supply of the fuel from the fuel source into electric energy, and a communication device to communicate with the processors. The processors may direct which of the one or more vehicles are to couple with and be powered by the electric energy of the energy chassis based on one or more of: the vehicle locations, the states of charge of the vehicle energy storage devices, an amount of the supply of the fuel of the energy chassis, and a chassis location of the energy chassis.

In one example, the one or more processors may direct which of the one or more vehicles are to couple with and be powered by the electric energy of the energy chassis based on an energy demand of the one or more vehicles. In another example, the one or more processors may direct which of the one or more vehicles are to couple with and be powered by the electric energy of the energy chassis based on a charging rate at which the energy storage devices onboard the one or more vehicles is charged with the electric energy. In one example, the one or more processors may direct which of the one or more vehicles are to couple with and be powered by the electric energy of the energy chassis based on a depletion rate at which vehicle electric energy stored in the energy storage devices onboard the one or more vehicles is discharged to power the one or more of the vehicles.

The energy chassis may include a propulsion motor that may propel the energy chassis using at least some of the electric energy from the energy converter. The energy chassis may move to the one or more vehicles to transfer the electric energy to power the vehicle energy storage devices onboard the one or more vehicles.

The energy chassis may include a chassis energy storage device that may store at least some of the electric energy that is generated by the energy converter. The chassis energy storage device may transfer the at least some of the electric energy to the vehicle energy storage device onboard the one or more vehicles. The chassis energy storage device may transfer the at least some of the electric energy to a second energy chassis. The chassis energy storage device may include one or more of a battery cell, a fuel cell, a capacitor storage bank, or a flywheel.

The fuel source may hold and the energy converter may convert one or more of natural gas, diesel, gasoline, kerosene, dimethyl ether, alcohol, hydrogen, or ammonia.

In one embodiment, a method is provided that includes measuring an amount of a supply of fuel of a fuel source of an energy chassis. The method including determining a chassis location of the energy chassis. The method may include converting at least a portion of the supply of fuel of the fuel source into electric energy. The method may include measuring a state of charge of a vehicle energy storage assembly of one or more vehicles and determining vehicle locations of the one or more vehicles. The method may include directing which of the one or more vehicles are to couple with and be powered by the electric energy of the energy chassis based on one or more of: the vehicle locations, the states of charge of the vehicle energy storage assembly of the one or more vehicles, and the amount of the supply of the fuel of the fuel source of the energy chassis.

In one example, the method may include propelling the energy chassis with a propulsion motor onboard the energy chassis. The method may include storing at least some of the electric energy generated by the energy chassis on a chassis energy storage device. The method may include transferring at least some of the electric energy from the chassis energy storage device to the one or more vehicles. The method may include transferring at least some of the electric energy from the chassis energy storage device to a second energy chassis.

In one embodiment, a control system is provided that includes one or more vehicles, an energy chassis, and a controller. The one or more vehicles may include a vehicle energy storage device. The vehicle energy storage device may be powered by the energy chassis. The energy chassis may include a fuel source to hold a supply of fuel, an energy converter to convert at least a portion of the supply of the fuel from the fuel source into electric energy, and a communication device to communicate with the one or more vehicles. The controller may direct which of the one or more vehicles are to couple with and be powered by the electric energy of the energy chassis based on one or more of: a vehicle location of the one or more vehicles, a state of charge of the vehicle energy storage device of the one or more vehicles, an amount of the supply of the fuel of the energy chassis, and a chassis location of the energy chassis.

In one example, the energy chassis may include a propulsion motor that may propel the energy chassis using at least some of the electric energy from the energy converter. The energy chassis may move to the one or more vehicles to transfer the electric energy to power the vehicle energy storage device of the one or more vehicles. The energy chassis may include a chassis energy storage device that may store at least some of the electric energy that is generated by the energy converter. The chassis energy storage device may transfer the at least some of the electric energy to the vehicle energy storage device of the one or more vehicles. The chassis energy storage device may transfer the at least some of the electric energy to a second energy chassis.

As used herein, the terms "software" and "firmware" are interchangeable and include any computer program stored in memory for execution by a computer, including RAM memory, ROM memory, EPROM memory, EEPROM memory, and non-volatile RAM (NVRAM) memory. The above memory types are exemplary only and are thus not limiting as to the types of memory usable for storage of a computer program.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different operating modes to select an operating mode of the one or more functional devices of a Head of Vehicle (HOV) unit and/or an End of Vehicle (EOV) unit, and then provide an output (e.g., the operating mode selected using the model). The controller may receive additional input of the change in operating mode that was selected, such as analysis of noise or interference in communication signals (or a lack thereof), operator input, or the like, that indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general-purpose signal processor, microcontroller, random access memory, hard disk, or the like). Similarly, the programs may be stand-alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

What is claimed is:

1. A control system comprising:
   one or more processors configured to determine vehicle locations of one or more vehicles and states of charge of energy storage devices onboard the one or more vehicles; and
   an energy chassis including:
      a fuel source configured to hold a supply of fuel,
      an energy converter configured to convert at least a portion of the supply of the fuel from the fuel source into electric energy,
      a communication device configured to communicate with the one or more processors of the one or more vehicles,
   the one or more processors configured to direct which of the one or more vehicles are to couple with and be powered by the electric energy of the energy chassis based on one or more of: the vehicle locations of the one or more vehicles, the states of charge of the energy storage devices onboard the one or more vehicles, an amount of the supply of the fuel of the energy chassis, and a chassis location of the energy chassis.

2. The control system of claim 1, wherein the one or more processors configured to direct which of the one or more vehicles are to couple with and be powered by the electric energy of the energy chassis based on an energy demand of the one or more vehicles.

3. The control system of claim 2, wherein the one or more processors are configured to direct which of the one or more vehicles are to couple with and be powered by the electric energy of the energy chassis based on a charging rate at which the energy storage devices onboard the one or more vehicles is charged with the electric energy.

4. The control system of claim 1, wherein the one or more processors are configured to direct which of the one or more vehicles are to couple with and be powered by the electric energy of the energy chassis based on a depletion rate at which vehicle electric energy stored in the energy storage devices onboard the one or more vehicles is discharged to power the one or more of the vehicles.

5. The control system of claim 1, wherein the energy chassis includes a propulsion motor configured to propel the energy chassis using at least some of the electric energy from the energy converter.

6. The control system of claim 5, wherein the energy chassis is configured to move to the one or more vehicles to transfer the electric energy to power the energy storage devices onboard the one or more vehicles.

7. The control system of claim 1, wherein the energy chassis includes a chassis energy storage device configured to store at least some of the electric energy that is generated by the energy converter, the chassis energy storage device configured to transfer the at least some of the electric energy to the energy storage devices onboard the one or more vehicles.

8. The control system of claim 7, wherein the chassis energy storage device is configured to transfer the at least some of the electric energy to a second energy chassis.

9. The control system of claim 8, wherein the chassis energy storage device includes one or more of a battery cell, a fuel cell, a capacitor storage bank, or a flywheel.

10. The control system of claim 1, wherein the fuel source is configured to hold and the energy converter is configured to convert one or more of natural gas, diesel, gasoline, kerosene, dimethyl ether, alcohol, hydrogen, or ammonia.

11. A method comprising:
measuring an amount of a supply of fuel of a fuel source of an energy chassis;
determining a chassis location of the energy chassis;
converting at least a portion of the supply of fuel of the fuel source into electric energy;
measuring a state of charge of a vehicle energy storage device of one or more vehicles;
determining vehicle locations of the one or more vehicles;
directing which of the one or more vehicles are to couple with and be powered by the electric energy of the energy chassis based on one or more of: the vehicle locations, the state of charge of the vehicle energy storage device of the one or more vehicles, and the amount of the supply of the fuel of the fuel source of the energy chassis.

12. The method of claim 11, further comprising propelling the energy chassis with a propulsion motor onboard the energy chassis.

13. The method of claim 11, further comprising storing at least some of the electric energy generated by the energy chassis on a chassis energy storage device.

14. The method of claim 13, further comprising transferring at least some of the electric energy from the chassis energy storage device to the one or more vehicles.

15. The method of claim 13, further comprising transferring at least some of the electric energy from the chassis energy storage device to a second energy chassis.

16. A control system comprising:
one or more vehicles including a vehicle energy storage device, the vehicle energy storage device configured to be powered by an energy chassis;
the energy chassis including:
a fuel source configured to hold a supply of fuel,
an energy converter configured to convert at least a portion of the supply of the fuel from the fuel source into electric energy,
a communication device configured to communicate with the one or more vehicles,
a controller configured to direct which of the one or more vehicles are to couple with and be powered by the electric energy of the energy chassis based on one or more of: a vehicle location of the one or more vehicles, a state of charge of the vehicle energy storage device of the one or more vehicles, an amount of the supply of the fuel of the energy chassis, and a chassis location of the energy chassis.

17. The system of claim 16, wherein the energy chassis includes a propulsion motor configured to propel the energy chassis using at least some of the electric energy from the energy converter.

18. The system of claim 17, wherein the energy chassis is configured to move to the one or more vehicles to transfer the electric energy to power the vehicle energy storage device of the one or more vehicles.

19. The system of claim 16, wherein the energy chassis includes a chassis energy storage device configured to store at least some of the electric energy that is generated by the energy converter, the chassis energy storage device configured to transfer the at least some of the electric energy to the vehicle energy storage device of the one or more vehicles.

20. The system of claim 19, wherein the chassis energy storage device configured to transfer the at least some of the electric energy to a second energy chassis.

* * * * *